US007749070B2

(12) United States Patent
Baerlocher et al.

(10) Patent No.: US 7,749,070 B2
(45) Date of Patent: Jul. 6, 2010

(54) GAMING DEVICE HAVING MULTIPLE SELECTABLE COMPONENTS THAT DETERMINE AN AWARD

(75) Inventors: Anthony J. Baerlocher, Reno, NV (US); John H. Zielinski, Reno, NV (US)

(73) Assignee: IGT, Reno, NV (US)

( * ) Notice: Subject to any disclaimer, the term of this patent is extended or adjusted under 35 U.S.C. 154(b) by 1695 days.

(21) Appl. No.: 10/941,608

(22) Filed: Sep. 14, 2004

(65) Prior Publication Data

US 2006/0068882 A1 Mar. 30, 2006

(51) Int. Cl.
*G06F 17/00* (2006.01)

(52) U.S. Cl. ........................................................ 463/20

(58) Field of Classification Search ............. 463/16–25, 463/42

See application file for complete search history.

(56) References Cited

U.S. PATENT DOCUMENTS

| | | | |
|---|---|---|---|
| 1,978,395 | A | 10/1934 | Groetchen |
| 2,545,644 | A | 3/1951 | Benton et al. |
| 3,420,525 | A | 1/1969 | Waders |
| 3,642,287 | A | 2/1972 | Lally et al. |
| 3,735,987 | A | 5/1973 | Ohki |
| 4,198,052 | A | 4/1980 | Gauselmann |
| 4,326,351 | A | 4/1982 | Heywood et al. |
| 4,410,178 | A | 10/1983 | Partridge |
| 4,448,419 | A | 5/1984 | Telnaes |
| 4,624,459 | A | 11/1986 | Kaufman |
| 4,695,053 | A | 9/1987 | Vazquez, Jr. et al. |
| 4,756,531 | A | 7/1988 | DiRe et al. |
| 4,826,169 | A | 5/1989 | Bessho et al. |
| 4,991,848 | A | 2/1991 | Greenwood et al. |
| 5,152,529 | A | 10/1992 | Okada |
| 5,342,047 | A | 8/1994 | Heidel et al. |
| 5,344,144 | A | 9/1994 | Canon |
| 5,362,052 | A | 11/1994 | Kubatsch |
| 5,364,100 | A | 11/1994 | Ludlow et al. |
| 5,395,111 | A | 3/1995 | Inoue |

(Continued)

FOREIGN PATENT DOCUMENTS

| | | |
|---|---|---|
| AU | 199716432 B2 | 9/1997 |

(Continued)

OTHER PUBLICATIONS

1DU Dice Unit Advertisement written by starpoint.uk.com, printed on May 14, 2001.

(Continued)

*Primary Examiner*—Ronald Laneau
(74) *Attorney, Agent, or Firm*—K&L Gates LLP

(57) ABSTRACT

A gaming device including a rotatable symbol display having a plurality of sections and a plurality of symbol modifying indicators. Each of the sections includes a value which is modified by a modifier generated by an activated symbol modifying indicators. The modified awards are added together and provided to the player in the game. In one embodiment, a selection display including a plurality of selections is displayed to the player. The selections are associated with each of the symbol modifying indicators. The gaming device enables the player to pick one or more of the selections to activate one or more of the symbol modifying indicators. The player picks the selections until the player picks a selection including a terminator.

31 Claims, 15 Drawing Sheets

U.S. PATENT DOCUMENTS

| | | | | |
|---|---|---|---|---|
| 5,407,200 | A | 4/1995 | Zalabak | |
| 5,456,465 | A | 10/1995 | Durham | |
| 5,490,670 | A | 2/1996 | Hobert | |
| 5,536,016 | A | 7/1996 | Thompson | |
| 5,584,764 | A | 12/1996 | Inoue | |
| 5,647,798 | A | 7/1997 | Falciglia | |
| 5,732,948 | A | 3/1998 | Yoseloff | |
| 5,752,881 | A | 5/1998 | Inoue | |
| 5,775,692 | A | 7/1998 | Watts et al. | |
| 5,788,573 | A | 8/1998 | Baerlocher et al. | |
| 5,823,874 | A | 10/1998 | Adams | |
| 5,848,932 | A | 12/1998 | Adams | |
| 5,882,261 | A | 3/1999 | Adams | |
| 5,885,157 | A | 3/1999 | Harada et al. | |
| 5,911,418 | A | 6/1999 | Adams | |
| 5,919,088 | A | 7/1999 | Weiss | |
| 5,947,820 | A | 9/1999 | Morro et al. | |
| 5,964,463 | A | 10/1999 | Moore, Jr. | |
| 5,980,384 | A | 11/1999 | Barrie | |
| 5,984,782 | A | 11/1999 | Inoue | |
| 5,997,400 | A | 12/1999 | Seelig et al. | |
| 6,004,207 | A | 12/1999 | Wilson, Jr. et al. | |
| 6,015,346 | A | 1/2000 | Bennett | |
| 6,033,307 | A | 3/2000 | Vancura | |
| 6,039,976 | A | 3/2000 | Mehra et al. | |
| 6,059,289 | A | 5/2000 | Vancura | |
| 6,059,658 | A | 5/2000 | Mangano et al. | |
| 6,086,066 | A | 7/2000 | Takeuchi et al. | |
| 6,089,976 | A | 7/2000 | Schneider et al. | |
| 6,089,977 | A | 7/2000 | Bennett | |
| 6,089,978 | A | 7/2000 | Adams | |
| 6,102,798 | A | 8/2000 | Bennett | |
| 6,117,009 | A | 9/2000 | Yaseloff | |
| 6,120,377 | A | 9/2000 | McGinnis, Sr. et al. | |
| 6,142,873 | A | 11/2000 | Weiss et al. | |
| 6,149,156 | A | 11/2000 | Faela | |
| 6,149,521 | A | 11/2000 | Sanduski | |
| 6,159,095 | A | 12/2000 | Frohm et al. | |
| 6,159,097 | A | 12/2000 | Gura | |
| 6,162,121 | A | 12/2000 | Morro et al. | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,235 | B1 | 1/2001 | Walker et al. | |
| 6,190,255 | B1 | 2/2001 | Thomas et al. | |
| 6,203,429 | B1 | 3/2001 | Demar et al. | |
| 6,213,876 | B1 | 4/2001 | Moore, Jr. | |
| 6,224,483 | B1 | 5/2001 | Mayeroff | |
| 6,231,442 | B1 | 5/2001 | Mayeroff | |
| 6,231,445 | B1 | 5/2001 | Acres | |
| 6,238,288 | B1 | 5/2001 | Walker et al. | |
| 6,270,411 | B1 | 8/2001 | Gura et al. | |
| 6,305,686 | B1 | 10/2001 | Perrie et al. | |
| 6,309,300 | B1 | 10/2001 | Glavich | |
| 6,312,334 | B1 | 11/2001 | Yoseloff | |
| 6,315,664 | B1 | 11/2001 | Baerlocher | |
| 6,316,663 | B1 | 11/2001 | Sakamoto | |
| 6,319,124 | B1 | 11/2001 | Baerlocher et al. | |
| 6,322,309 | B1 | 11/2001 | Thomas et al. | |
| 6,328,649 | B1 | 12/2001 | Randall et al. | |
| 6,334,814 | B1 | 1/2002 | Adams | |
| 6,336,860 | B1 | 1/2002 | Webb | |
| 6,340,158 | B2 | 1/2002 | Preice et al. | |
| 6,343,988 | B1 | 2/2002 | Walker et al. | |
| 6,347,996 | B1 | 2/2002 | Gilmore et al. | |
| 6,364,767 | B1 | 4/2002 | Brossard et al. | |
| 6,375,187 | B1 | 4/2002 | Baerlocher | |
| 6,398,218 | B1 | 6/2002 | Vancura | |
| 6,406,369 | B1 | 6/2002 | Baerlocher et al. | |
| 6,416,408 | B2 | 7/2002 | Tracy et al. | |
| 6,419,579 | B1 | 7/2002 | Bennett | |
| 6,439,995 | B1 | 8/2002 | Hughs-Baird | |
| 6,454,651 | B1 | 9/2002 | Yoseloff | |
| 6,461,241 | B1 | 10/2002 | Webb et al. | |
| 6,464,582 | B1 | 10/2002 | Baerlocher et al. | |
| 6,471,208 | B2 | 10/2002 | Yoseloff et al. | |
| 6,481,713 | B2 | 11/2002 | Perrie et al. | |
| 6,491,584 | B2 | 12/2002 | Graham et al. | |
| 6,506,118 | B1 | 1/2003 | Baerlocher et al. | |
| 6,561,904 | B2 | 5/2003 | Locke et al. | |
| 6,589,114 | B2 | 7/2003 | Rose | |
| 6,659,864 | B2 | 12/2003 | McGahn et al. | |
| 6,676,512 | B2 | 1/2004 | Fong et al. | |
| 6,719,630 | B1 | 4/2004 | Seelig et al. | |
| 6,726,204 | B2 | 4/2004 | Inoue | |
| 7,601,062 | B2 * | 10/2009 | Cole et al. | 463/20 |
| 2002/0072402 | A1 | 6/2002 | Baerlocher | |
| 2002/0142822 | A1 | 10/2002 | Baerlocher et al. | |
| 2002/0183109 | A1 | 12/2002 | McGahn et al. | |
| 2003/0027623 | A1 | 2/2003 | Rose et al. | |
| 2003/0040360 | A1 | 2/2003 | Kaminkow | |
| 2003/0078093 | A1 | 4/2003 | Simms | |
| 2003/0078096 | A1 | 4/2003 | Kaminkow | |
| 2003/0119583 | A1 | 6/2003 | Kaminkow et al. | |
| 2003/0162578 | A1 | 8/2003 | Baerlocher et al. | |
| 2003/0162579 | A1 | 8/2003 | Gauselmann | |
| 2003/0162584 | A1 | 8/2003 | Hugh-Baird | |
| 2003/0195027 | A1 | 10/2003 | Baerlocher | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0018866 | A1 | 1/2004 | Inoue | |
| 2004/0026854 | A1 | 2/2004 | Inoue | |
| 2004/0036218 | A1 | 2/2004 | Inoue | |
| 2004/0038726 | A1 | 2/2004 | Inoue | |
| 2004/0195773 | A1 * | 10/2004 | Masci et al. | 273/317 |
| 2006/0030392 | A1 * | 2/2006 | Rodgers et al. | 463/16 |
| 2006/0121969 | A1 * | 6/2006 | Marks et al. | 463/16 |
| 2006/0183535 | A1 * | 8/2006 | Marks et al. | 463/20 |
| 2006/0246977 | A1 * | 11/2006 | Cannon | 463/13 |
| 2007/0191087 | A1 * | 8/2007 | Thomas et al. | 463/20 |

FOREIGN PATENT DOCUMENTS

| | | | |
|---|---|---|---|
| AU | A-50327/96 | | 10/1997 |
| AU | A-63553/98 | | 10/1998 |
| EP | 0688002 | A1 | 12/1995 |
| EP | 0 798 676 | A1 | 10/1997 |
| EP | 0874337 | A1 | 10/1998 |
| EP | 0926645 | A2 | 6/1999 |
| EP | 0 945 837 | A2 | 9/1999 |
| EP | 0944030 | A2 | 9/1999 |
| EP | 1 184 822 | | 3/2002 |
| GB | 2 090 690 | A | 7/1982 |
| GB | 2 096 376 | A | 10/1982 |
| GB | 2 097 160 | A | 10/1982 |
| GB | 2 100 905 | A | 1/1983 |
| GB | 2 105 891 | A | 3/1983 |
| GB | 2 117 155 | A | 10/1983 |
| GB | 2 137 392 | A | 10/1984 |
| GB | 2 161 008 | A | 1/1986 |
| GB | 2 170 636 | A | 8/1986 |
| GB | 2 181 589 | A | 4/1987 |
| GB | 2 183 882 | A | 6/1987 |
| GB | 2 191 030 | A | 12/1987 |
| GB | 2 222 712 | A | 3/1990 |
| GB | 2 225 889 | A | 6/1990 |
| GB | 2 226 436 | A | 6/1990 |
| GB | 2 242 300 | A | 9/1991 |
| GB | 2 262 642 | A | 6/1993 |
| GB | 2 328 311 | A | 2/1999 |

WO WO 00/12186 3/2000

OTHER PUBLICATIONS

4DU Dice Unit Advertisement written by starpoint.uk.com, printed on Sep. 3, 2002.
Bally Slot Machines Electro-Mechanicals 1964-1980 Book [In Part], Revised 3rd Edition written by Marshall Fey.
Barn Yard Advertisement written by Aristocrat, not dated.
Barn Yard Article written by Strictly Slots, published in Mar. 2002.
Bonus Times Article written by Bally Gaming, published in Jul. 2000.
Dice Games Article describing Poker Dice, published prior to 2001.
Dice Shaker, Advertisement, s.a. Elaut, n.v., not dated.
Double Dice Advertisement written by JHV Gaming Products, undated, and English explanation from errel.com, printed on Jan. 24, 2003.
Easy Street Article written by Strictly Slots, published in Jul. 2000.
Free! 7-Day Trial on Daval's Reel Dice Advertisement written by Gerber & Glass, published in 1936.
Gold Fever Advertisement written by Atronic Casino Technology, Ltd., published 1999.
Jewel in the Crown Advertisement written by IGT, published in 1999.
Jewel in the Crown Advertisements written by Barcrest Ltd., published 1999.
Let's Make a Deal Game Advertisement written by Bally Gaming Systems, published in 1999.
Let's Make a Deal geocities.com (2 pages), printed on Mar. 16, 2001.
Let's Make a Deal written by fortunecity.com (4 pages), printed on Mar. 21, 2001.
Let's Make a Deal written by geocities.com (10 pages), printed on Mar. 21, 2001.
Let's Make a Deal written by Illinoislottery.com (1 page), printed on Mar. 21, 2001.
Roll & Win Advertisement written by WMS Gaming, wmsgaming.com, printed Jun. 8, 2001.
Slot Machine Buyer's Handbook, A Consumer's Guide to Slot Machines [In Part] written by David L. Saul and Daniel R. Mead, published 1998.
Slot Machines A Pictorial History of the First 100 Years, 5th edition [In Part], written by Marshall Fey, published 1983 to 1997.
Slot Machines On Parade [In Part] written by Robert N. Geddes and illustrated by Daniel R. Mead, published 1980.
Take Your Pick Article, written by Strictly Slots IGT/Anchor Games, published in Mar. 2001.
Take Your Pick Brochure, written by IGT, published in 1999.
The Deals of Let's Make a Deal written by fortunecity.com (2 pages), printed on Jul. 20, 2004.
The Official Let's Make a Deal Website written by Bally Gaming System Website, printed on Mar. 16, 2001.
Top Dollar Brochure, written by IGT, published in 1998.
Vision Series™/Good Times™ Brochure written by IGT, published in 1999.
Wheel of Fortune Brochure, written by IGT, published in 1998.
Wheel of Fortune Brochure, written by IGT, published in 1999.
X Factor Brochure written by WMS Gaming, Inc., published in 1998.
Yahtzee Bonus Advertisement, written by Mikohn Winning Solutions Worldwide, published 1999.
Yahtzee Video Game Advertisement, written by Mikohn Winning Solutions Worldwide, published 1999.

* cited by examiner

GAMING DEVICE HAVING MULTIPLE SELECTABLE COMPONENTS THAT DETERMINE AN AWARD

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Another way to enhance a player's enjoyment, entertainment and excitement with a gaming device is by including lights, sounds and other visual or audio or audio-visual effects in the gaming machines.

Certain known gaming devices use mechanical devices such as reels, wheels and light displays to enhance the attraction of the machines to players and also to enhance the player's game playing experience. These mechanical devices enable a player to see physical movements of a game, a portion of a game, or a functional game event or element which increases the player's enjoyment of the game.

To increase player enjoyment and excitement, it is desirable to provide new and different mechanical devices in conjunction with wagering gaming devices.

SUMMARY OF THE INVENTION

One embodiment of the present invention relates generally to a wagering gaming machine including a primary or secondary game having a symbol display and a plurality of selectable symbol modifying indicator generators generally referred to as a symbol modifying indicator. Each of the plurality of selectable symbol modifying indicators are operable to perform two functions, including indicating one of the symbols displayed by the symbol display and indicating a modifier associated with that symbol. The symbol display and symbol modifying indicators co-act to display an outcome provided to a player in the game based on the indicated symbols and the generated modifiers.

In one embodiment, the gaming device enables a player to select or determine which of the symbol modifying indicators are activated. In one such embodiment, the game includes a plurality of player selectable selections. The game enables the player to pick at least one selection from the plurality of selections to activate at least one of the symbol modifying indicators. It should be appreciated that other suitable methods could be employed to determine how many symbol modifying indicators are activated for the game.

In one embodiment, the symbol display includes a mechanical movable or rotatable display which generates a plurality of symbols such as award values. The generated award values and associated modifiers determine the award provided to the player. In one such embodiment, a player picks a selection from a selection display and the gaming device activates a symbol modifying indicator associated with that picked selection. The gaming device moves, rotates or otherwise activates the rotatable display to generate a plurality of award values in the game. After the rotatable display stops rotating or spinning, an award value is indicated by each activated symbol modifying indicator. The modifier generated by each activated symbol modifying indicator modifies the award value indicated by that activated symbol modifying indicator. For example, in one embodiment, each of the symbol modifying indicators generate a multiplier which multiplies the award value indicated on the section of the rotatable display adjacent to or indicated by that activated symbol modifying indicator. The modified award values are provided to the player.

In one embodiment, the symbol modifying indicators are each mechanical dice operable to generate a modifier such as a multiplier in the game. The gaming device also includes a selection display which includes at least one and preferably a plurality of selections. Each of the selections are associated with one of the symbol modifying indicators such as the mechanical dies. The gaming device enables the player to pick at least one selection to activate one or more of the mechanical dies. After the player's selections are complete, the gaming device rotates a rotatable display such as a reel strip, a mechanical reel or a simulated reel on a video display and also causes each selected mechanical die to generate a modifier such as a multiplier. When the rotatable display stops spinning, the gaming device determines a total award to provide to the player based on at least one of the award values indicated by the rotatable display and the modifiers generated by the mechanical die.

In one embodiment, each of the symbol modifying indicators indicate one of the sections on the rotatable display; however, only the activated modifier generators are employed in the game to modify the award values displayed by the rotatable display and indicated by the activated symbol modifying indicators. The modifier generated by the activated symbol modifying indicator modifies the award value indicated by that activated symbol modifying indicator. The modified award is added to the player's total award in the game. In one embodiment, the symbol modifying indicators are each positioned adjacent to one of the positions of the rotatable display. In another embodiment, each of the symbol modifying indicators are positioned adjacent to or between two positions of the rotatable display. In this embodiment, the modifier generated by the symbol modifying indicators modifies the award values in each of the sections positioned adjacent to the activated symbol modifying indicators. The modified awards are provided to the player.

As indicated above, in one embodiment, the gaming device enables the player to pick a selection to activate one of the symbol modifying indicators in the game. In an alternative embodiment, the gaming device enables the player to pick a plurality of selections to activate one or more of the symbol modifying indicators in the game. The number of selections may be greater than, equal to or less than the number of symbol modifying indicators. In this embodiment, the selection display includes a plurality of selections and at least one of the selections includes a terminator. The other selections (i.e., the remaining selections) include indicators such as messages which instruct or enable the player to pick one or more additional selections. It should be appreciated that the selection display may include selections that include one or more terminators.

In the above embodiment, the player picks a selection and activates the symbol modifying indicator associated with that selection. If the selection includes a pick again message or similar message, the gaming device enables the player to pick another selection. The player then picks another selection from the selection display. The player continues to pick selections until the player picks the selection associated with termination indicator, terminator or terminator symbol. The terminator causes the gaming device to stop the player from picking any more selections from the selection display in the game. In one embodiment, the selection including the terminator activates one of the symbol modifying indicators in the game. In another embodiment, the selection including the terminator does not activate a symbol modifying indicator.

In a further embodiment, the selections include a number of the symbol modifying indicators to be activated in a play of the game. For example, if one of the selections includes the number three, then three of the symbol modifying indicators are activated. In one embodiment, the gaming device automatically selects the symbol modifying indicators to activate based on the number revealed by the picked selection. In another embodiment, the gaming device enables the player to pick the symbol modifying indicators to activate based on the number associated with the picked selection.

In another embodiment, each of the symbol modifying indicators include a plurality of section indicators which indicate sections of the rotatable display. In one aspect of this embodiment, at least one of the section indicators associated with two different symbol modifying indicators indicates the same section of the rotatable display. It should be appreciated that two or more of the section indicators associated with the symbol modifying indicators may indicate the same section of the rotatable display in a play of the game. It should also be appreciated that one, a plurality or all of the section indicators for each of the symbol modifying indicators may be activated or indicate the same section or different sections in a play of the game. By at least having two section indicators which indicate the same section of the rotatable display, the gaming device enables a player to obtain more symbols or awards in a play of the game and enables the player to possibly obtain a relatively large award in the play of the game.

Although the above embodiments include one rotatable display such as a reel strip or mechanical reel and a plurality of symbol modifying indicators or mechanical dies, it should be appreciated that the gaming device may include one or more mechanical reels or other suitable display devices where one or more symbol modifying indicators are associated with each of those mechanical reels or display devices.

It should thus be appreciated that each activated symbol modifying indicator serves a dual purpose by indicating one of the symbols and the modifier.

Another advantage of the present invention is to provide a gaming device that enables the player to pick at least one selection to determine multiple different components of an award.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Figure 1A:
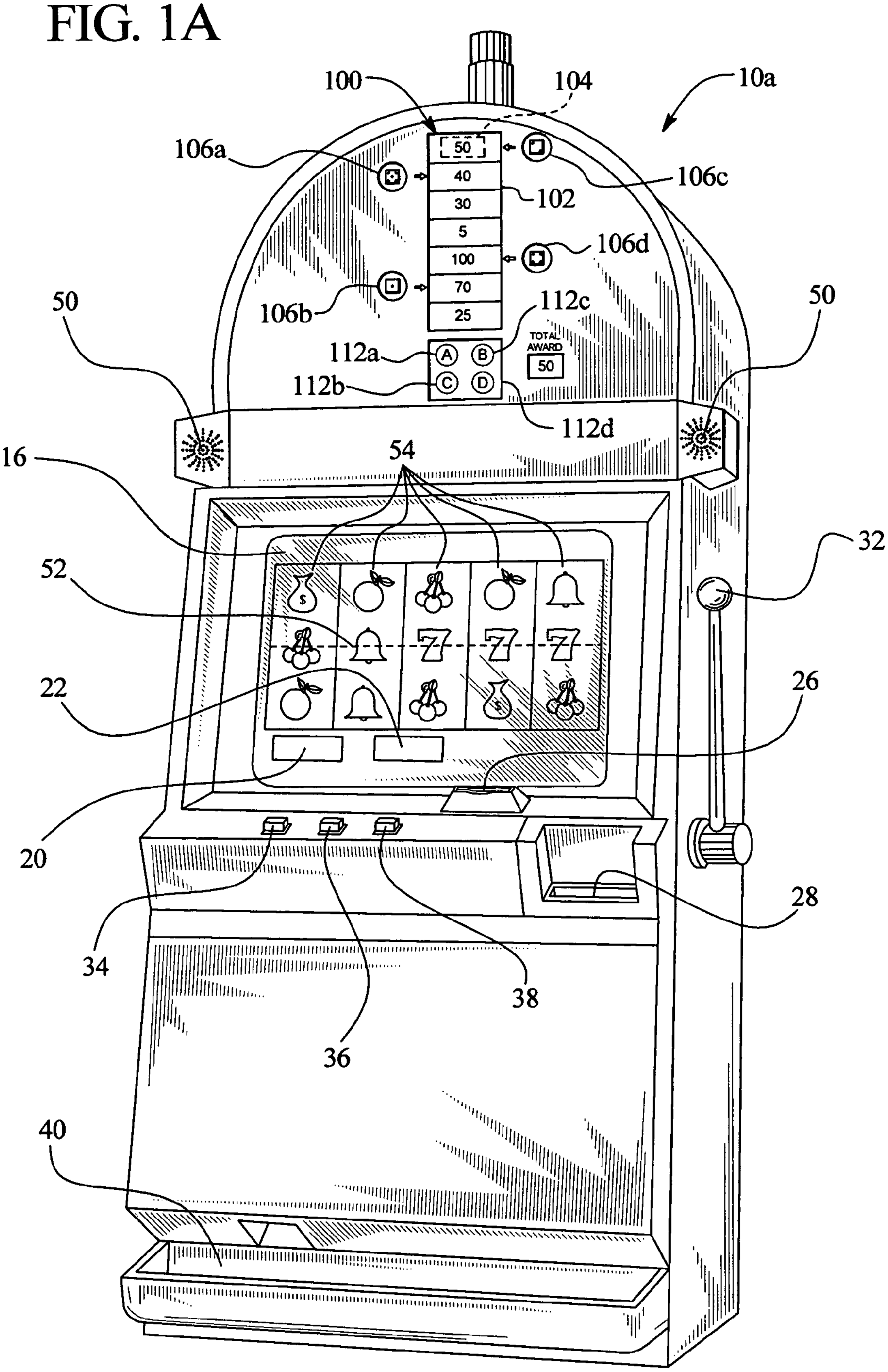
FIG. 1A is a front perspective view of one embodiment of the gaming device of the present invention.
Figure 1B:
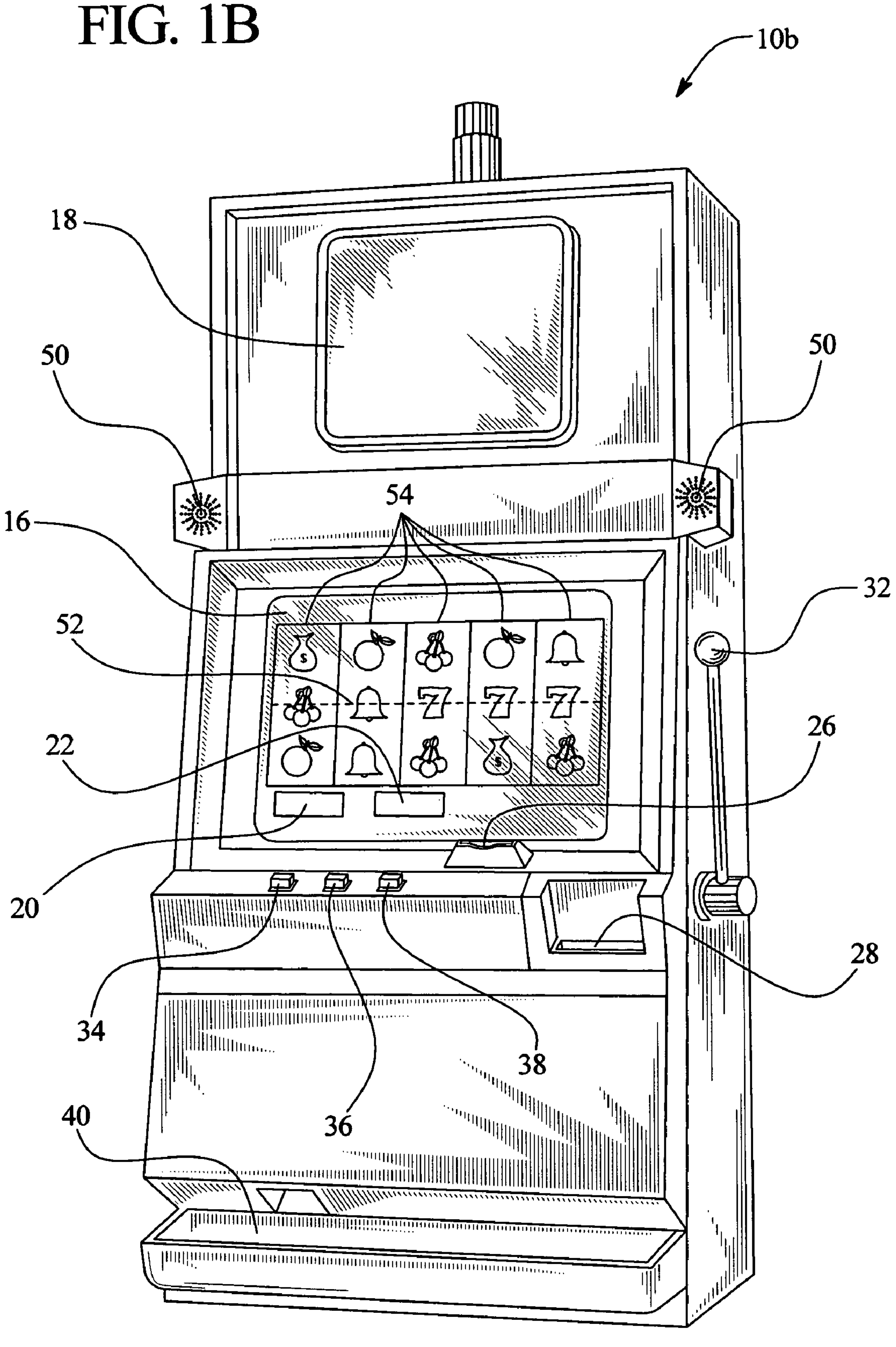
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
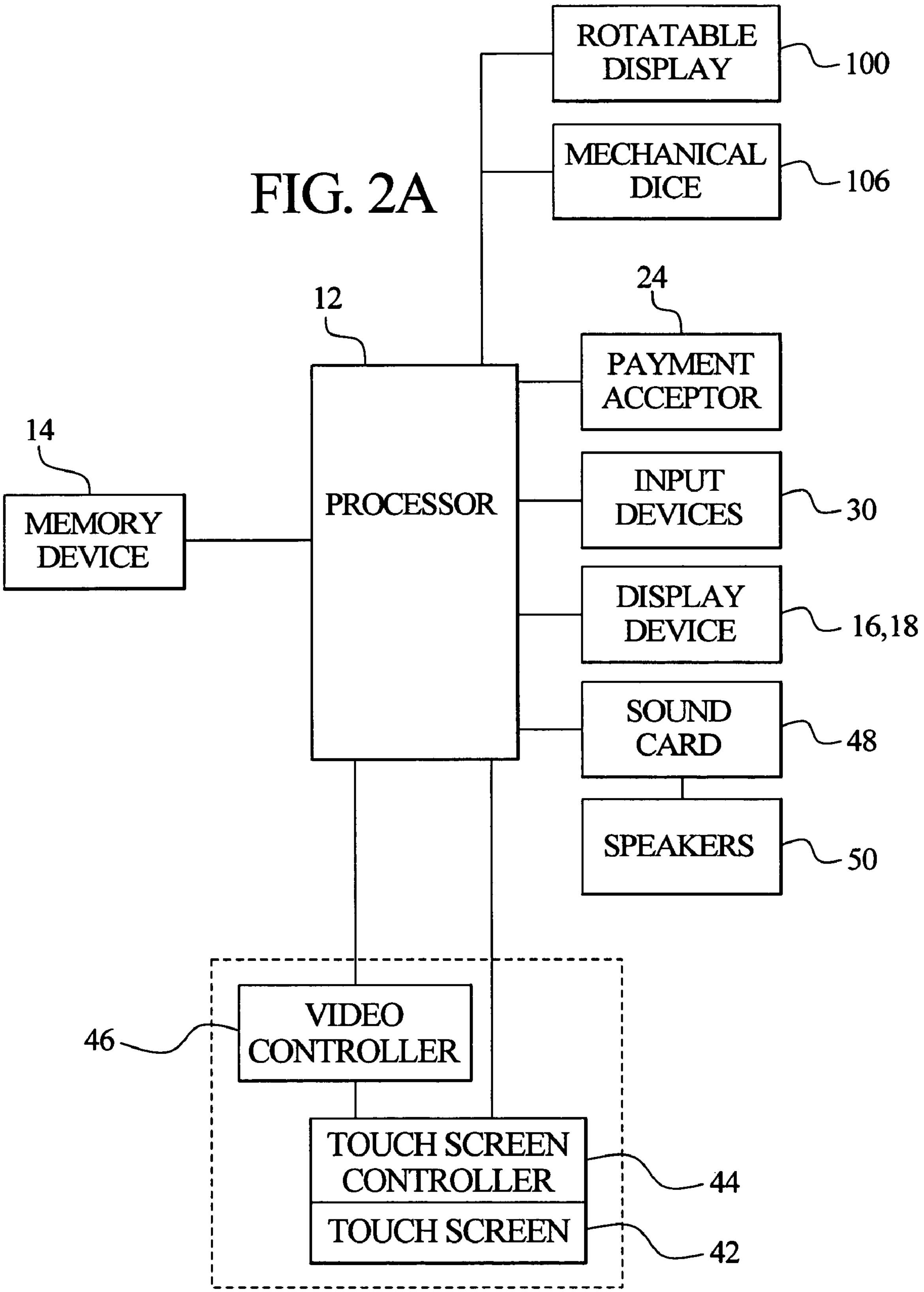
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a computer or controller.

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game images or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one embodiment, the symbols, images and indicia displayed on or of the display device are in mechanical form. That is, the display device may include any electromechanical device, such as one or more mechanical objects, such as one or more rotatable wheels, reels or dice, configured to display at least one and preferably a plurality of game images or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
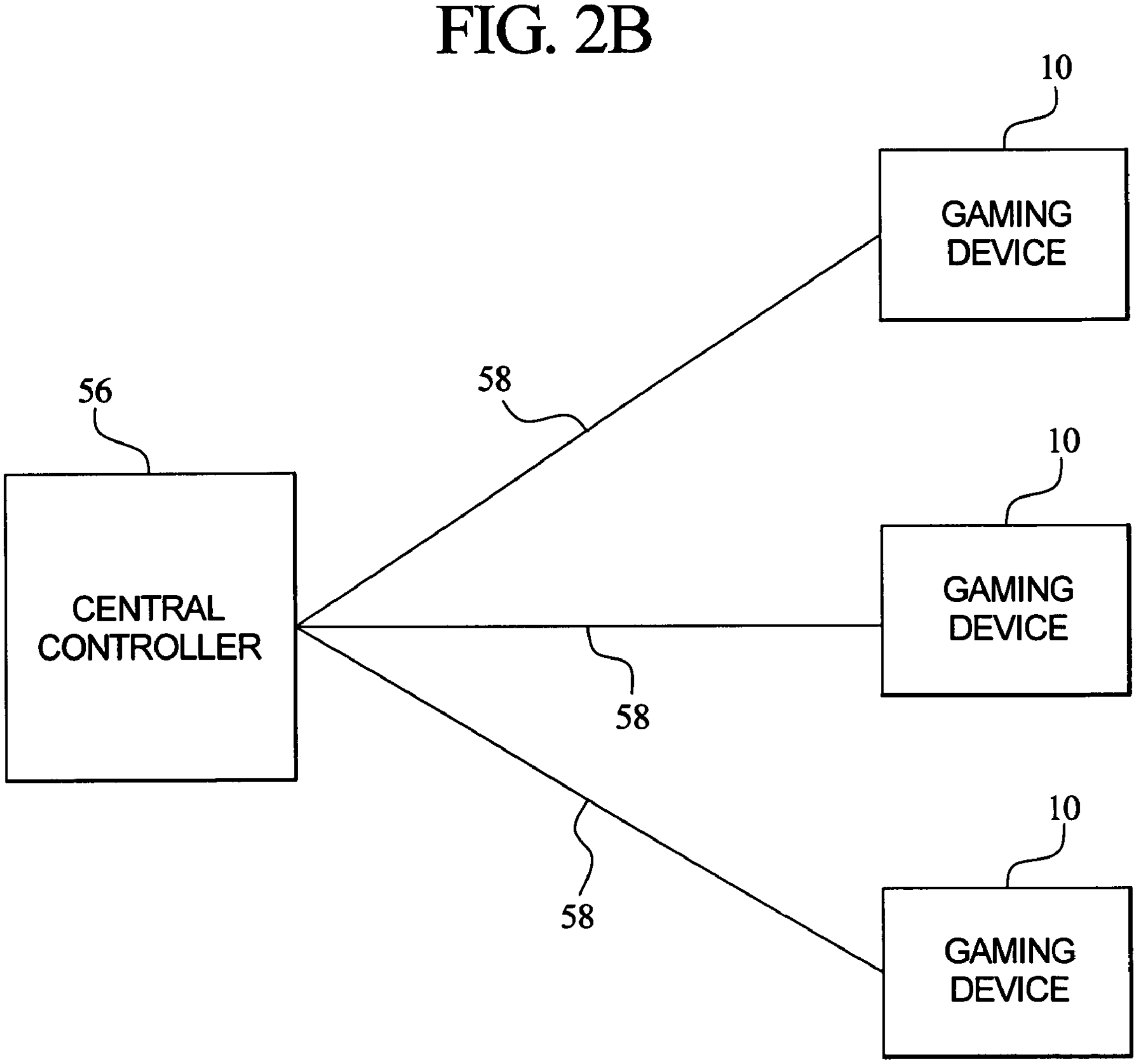
FIG. 2B is a schematic block diagram illustrating a plurality of gaming terminals and communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Multiple Selectable Components

One embodiment of the present invention is directed to a gaming device having a game including a symbols display such as a rotatable symbol display and a plurality of symbol modifying indicator generators generally referred to as symbol modifying indicators which determine a total award provided to a player in the game.

Figure 3A:
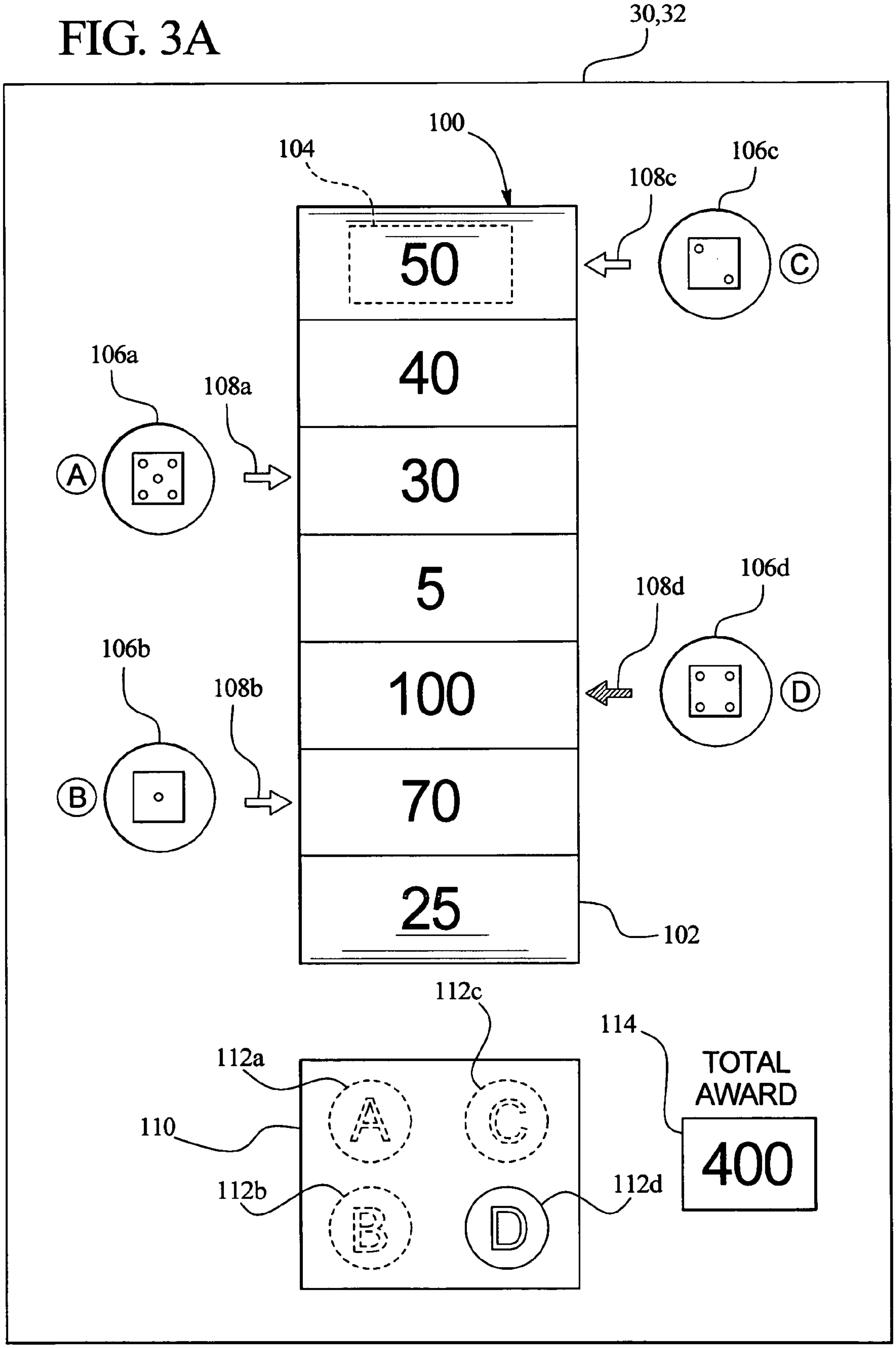
FIG. 3A is an enlarged elevation view of one of the display devices of FIGS. 1A and 1B illustrating one embodiment of the present invention.

Referring now to FIGS. 1A and 3A, in one embodiment, the gaming device includes a rotatable symbol display 100 which includes a plurality of sections 102. Each sections includes at least one symbol representing an outcome such as a value or award value 104. In one embodiment, the sections 102 each include an award value 104 such as the award values of fifty, forty, thirty, five, one hundred, seventy or twenty-five as illustrated in FIG. 3A. It should be appreciated that the symbols may be characters, numbers, letters, pictures or any other suitable images. The award values associated with each of the sections 102 of the rotatable display 100 are selectable to determine a first component of the outcome or award provided to the player in the game.

The gaming device includes at least one and preferably a plurality of symbol modifying indicators such as mechanical dice 106*a*, 106*b*, 106*c* and 106*d*. In one embodiment, each of the mechanical dies is operable to indicate at least one of the sections 102 of the rotatable symbol display 100. In this embodiment, each mechanical die is positioned adjacent to an area of the rotatable symbol display. It should be appreciated that the symbol modifying indicators or dice may be positioned in any suitable location with respect to the symbol display.

In one embodiment, the rotatable symbol display 100 includes a plurality of sections 102 where each of the sections includes at least one value such as an award value 104. It should be appreciated that the rotatable symbol display 100 may include any suitable number of sections 102 where each of the sections include at least one award value or other suitably functional symbol. In one embodiment, the award values or awards 104 associated with each of the sections are different. In another embodiment, at least two of the award values or awards associated with each of the sections are the same. In a further embodiment, at least one of the awards associated with the sections 102 includes a relatively large award and the awards associated with the remaining sections include relatively small awards. It should be appreciated that any suitable outcome or outcome component may be associated with the sections of the symbol display and that the symbol display may take any suitable form.

Figure 3B:
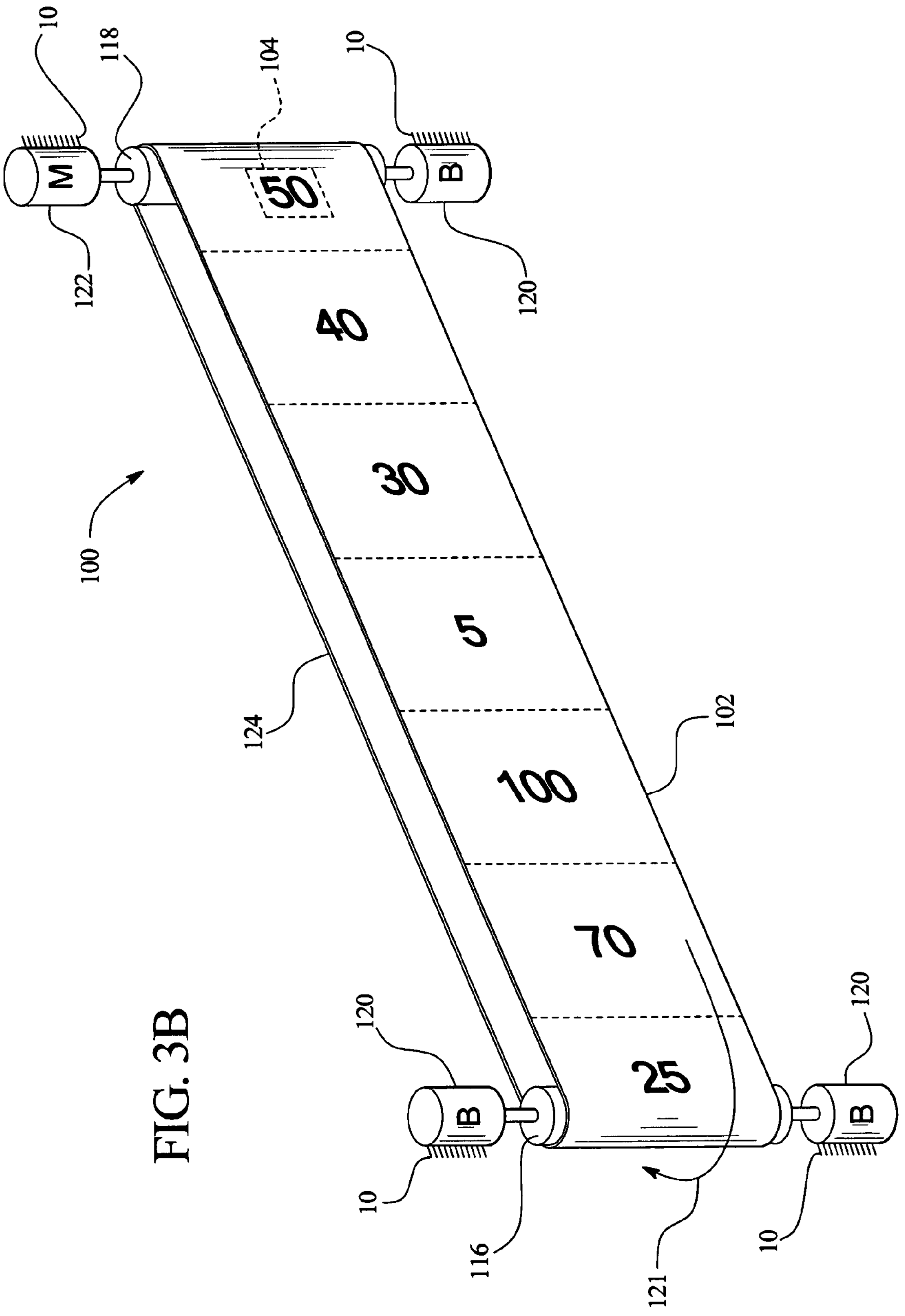
FIG. 3B is a diagrammatic front perspective view of a rotatable display associated with the embodiment of FIG. 3A employing two rollers and a display belt in tension with the rollers.

Referring to FIG. 3B, one embodiment of the rotatable symbol display is generally illustrated where the rotatable symbol display includes a guide roller 116 and a drive roller 118 suitably attached to the cabinet of the gaming device 10. The symbol display is operable to move in clockwise and counterclockwise directions as determined by the controller of the gaming device 10. The actuator for the symbol display can be any suitable actuator such as a stepper motor having a drive unit (not shown) and programmable indexer (not shown), which are well known in the art, and enable the motor to precisely turn the drive roller 118. The second roller 116 in the illustrated embodiment is a follower roller and is suitably attached to two bearings which are suitably fixed to the cabinet of the gaming device 10. Follower roller 116 is driven by the belt 124 which frictionally engages the outer surface of the rollers 116 and 118, such that the belt 124 does not slip along the rollers 116 and 118 due to gravity or due to the rotation of the rollers. When the actuator 122 drives roller 118, belt 124 moves and in turn rotates the follower roller 116. The symbols are suitably displayed by the belt or a suitable surface attached to the belt.

As illustrated in FIGS. 3A and 3B, the symbols display includes a plurality of sections 102. In one embodiment, each section displays a value, which represents an award or award value such as the award of fifty indicated on the top section of the rotatable display in FIG. 3B. Arrow 121 indicates the rotational direction of the rotatable symbol display 100 in one embodiment. It should be appreciated that the rotatable symbol display 100 may rotate in any suitable direction. It should further be appreciated that the rotatable symbol display 100 may be a horizontally positioned, vertically positioned, or configured in any suitable orientation. It should also be appreciated that the rotatable symbol display may include any other suitable display which is operable to display a plurality of symbols at different positions relative to the symbol modifying indicators.

In one embodiment, the symbol modifying indicators such as the mechanical dice are activated by the gaming device or the player to cause the mechanical dice to generate modifiers in a game. In one embodiment, a selection display 110 is displayed to the player and includes a plurality of selections such as selections 112*a*, 112*b*, 112*c* and 112*d*. Each of the selections 112 is associated with one of the mechanical dies 106. For example, selection 112*a* is associated with mechanical die 106*a*, selection 112*b* is associated with mechanical die 106*b*, selection 112*c* is associated with mechanical die 106*c* and selection 112*d* is associated with mechanical die 106*d*. Each selection 112 is initially masked to conceal the message provided to the player. For example, selections 112*a*, 112*b*, 112*c* and 112*d* include letters A, B, C and D, respectively, which are each associated with one of the mechanical dies 106.

In one embodiment, a total award display 114 indicates any values such as an award or awards obtained by the player in the game. The award indicated by the total award display 114 is provided to the player at the end of a game.

In one embodiment, the gaming device enables a player to pick one of the selections 112*a*, 112*b*, 112*c* or 112*d* from the selection display 110 at the start of a game. The gaming device reveals or indicates the indicator or message associated with the picked selection. For example, in FIG. 3A, when the player picks selection 112*a*, the gaming device reveals the indicator or letter A which is associated with symbol modifying indicator 106*a*. After the symbol modifying indicator associated with the picked selection is revealed, the gaming device rotates the rotatable display 100 and activates the activated symbol modifying indicator 106. The gaming device stops the rotatable display 100 and causes the activated symbol modifying indicator to generate a modifier such as a multiplier.

In one embodiment, the outcome or award provided to the player is based on two components. The two components are the modifier generated by the activated symbol modifying indicator and the value determined by the rotatable display 100 and indicated by that activated symbol modifying indicator. For example in FIG. 3A, symbol modifying indicator 106*a* indicates the section on the rotatable display 100 that includes an award value of thirty. The section indicator 108*a* associated with the symbol modifying indicator 106*a* indicates the section and the award value on the rotatable display to be modified by a particular modifier. The modified award is provided to the player and indicated by the total award display 114.

The gaming device therefore provides a plurality of components or award indicators to a player for each selection made by the player in the game, where the components or indicators are combined to determine the player's award. The present invention increases players' excitement and enjoyment of the game by providing multiple components for each selection picked by the player where the components combine to determine the players' award and thereby gives players an opportunity to receive a potentially large award in the game.

Referring again to FIG. 3A, one example of the above embodiment is illustrated where the gaming device includes a rotatable symbol display 100 and four symbol modifying indicators in the form of mechanical dies 106*a*, 106*b*, 106*c* and 106*d*. Additionally, four section indicators 108*a*, 108*b*, 108*c* and 108*d* are associated with each of the mechanical dies, respectively, and are each adapted to indicate one of the sections 102 on the rotatable symbol display 100. In this example, the player picks one of the selections 112 on selection display 110 to activate one of the mechanical dies 106 in a game. In the example, the player picks selection 112*d* which reveals the letter D. The letter D is associated with symbol modifying indicator 106*d* and therefore activates symbol modifying indicator 106*d* as illustrated in FIG. 3A. The gaming device then rotates the rotatable symbol display 100 and causes the symbol modifying indicator 106*d* to generate a modifier such as a multiplier. When the rotatable symbol display stops spinning, the plurality of award values are displayed to the player. Additionally, the symbol modifying indicator or mechanical die 106*d* generates a modifier, which is represented by a symbol or number displayed by the mechanical die.

As shown in FIG. 3A, the activated symbol modifying indicator 106*d* generates a symbol which represents the number four. The symbol modifying indicator 106 therefore generated a multiplier of 4×. Furthermore, the section indicator 108*d* associated with the activated symbol modifying indicator 106*d* indicates a section on the rotatable display that includes an award value of one hundred. The gaming device multiplies the award value of one hundred indicated by section indicator 108*d* by the multiplier of 4× generated by the symbol modifying indicator 106*d* to produce a modified award value of four hundred. The modified award value of four hundred is added to the player's total award of zero to give the player a total award of four hundred for the game as indicated by the total award display 114. At this point, the game ends and the player receives the total award of four-hundred for the game. It should be appreciated, however, that the gaming device may enable the player to pick one or more additional selections from the selection display 110 to provide the player with additional awards in the game.

In one embodiment, as described above, a player picks one or more of the selections and then activates one or more of the symbol modifying indicators. The gaming device then causes the rotatable symbol display to rotate and any activated symbol modifying indicators to generate modifiers. It should be appreciated that the gaming device may cause the rotatable display to rotate and the symbol modifying indicators to generate modifiers before the player picks any of the selections, at the same time as the player picks the selections or after the player picks the selections. It should also be appreciated that the gaming device may cause the rotatable display to rotate before the player picks any of the selections and then cause the symbol modifying indicators to generate modifiers. Alternatively, the gaming device may cause the symbol modifying indicators to generate modifiers before the player picks any of the selections and then cause the rotatable display to rotate after the player picks the selections. It should be appreciated that the gaming device may cause the rotatable display to rotate or the symbol modifying indicators to generate modifiers before, during or after the player picks any of the selections.

Figure 4A:
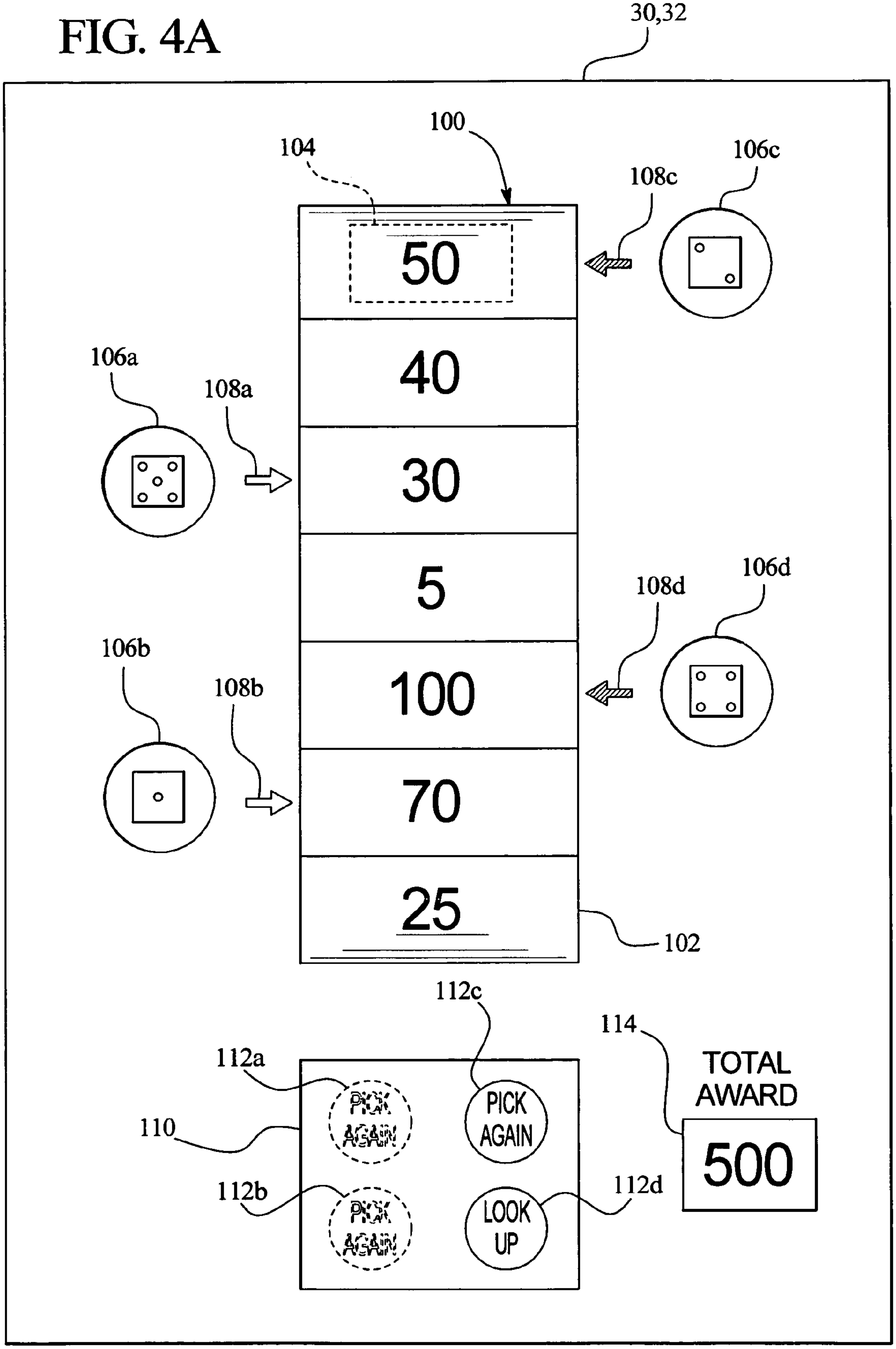
FIGS. 4A, 4B, 4C, 4D, 4E and 4F are enlarged elevation views an example of an alternative embodiment of the present invention.

Referring now to FIG. 4A, an alternative embodiment of the present invention includes selections 112*a*, 112*b*, 112*c* and 112*d* having at least one terminator or terminator symbol which terminates or ends a game when a player picks the selection including the terminator or terminator symbol. In one embodiment, each of the selections includes an indicator or message such as "pick again" or "look-up." If a player picks a selection including the message "pick again" the gaming device enables the player to pick another selection from the selection display 110. If the player picks a selection including the message "look-up," (i.e., a terminator) the gaming device terminates the game and prevents the player from picking more selections from the selections display 110. It should be appreciated that the selections may include one or more of the message "pick again" or one or more terminators or terminator symbols such as the message "look-up" in a game.

In one embodiment, the gaming device enables the player to pick one of the selections 112*a*, 112*b*, 112*c* or 112*d* from the selection display 110 at the start of the game. The gaming device activates the section indicator or arrow 108 associated with the mechanical die 106 corresponding to the selection picked by the player (activation of the section indicators is shown by shading the activated section indicators). For example, if the player picks selections 112*c*, the gaming device activates indicator 108*c* of the symbol modifying indicator 106*c*. If the player picks selection 112*d*, the gaming device activates indicator 108*d* of the mechanical die 106*d*. The gaming device enables the player to pick selections 112 until the player picks the selection which reveals the message "look up" (i.e., the terminator). For example, selection 112*d* includes the message "look up." This selection causes the gaming device to terminate the players ability to pick more selections in the game and causes the rotatable display 100 to rotate and generate symbols and each of the symbol modifying indicators 106 to generate a modifier in the game. The gaming device activates or rotates the rotatable display 100 and causes each of the mechanical dies 106 to generate a modifier such as a multiplier as illustrated in FIG. 3A. When the rotatable display stops rotating and each of the activated mechanical dies 106 indicates a multiplier, the gaming device determines the award to be provided to the player for the game.

As described above, each selection picked by the player generates two components which combine or otherwise form the outcome or award provided to the player for that picked selection. One of the components is an award value associated with at least one of the sections 102 on the rotatable display 100 and the other component is a corresponding modifier such as a multiplier generated by any activated symbol modifying indicator such as mechanical die 106. Specifically, the gaming device provides an outcome or award determined by summing the products of each of the award values indicated by an activated mechanical die and the modifiers generated by those activated mechanical dies. For example, as illustrated in FIG. 3A, section indicators 108*c* and 108*d* have been activated in the game. Therefore, the gaming device provides an award of five hundred to the player which is based on the value of fifty multiplied by the multiplier of 2× generated by mechanical die 106*c* and the value of one hundred multiplied by the modifier of 4× generated by the mechanical die 106*d*. The total award is transferred to the total award display 114 and provided to the player at the end of the game.

In one embodiment, the gaming device enables the player to pick selections 112 from the selection display 110 to activate one or more of the symbol modifying indicators or mechanical dies 106. The section indicators 108 indicate the sections 102 of the rotatable display 100 that are to be independently activated according to the selection or selections 112 picked by player from the selection display 110. Therefore, a player may activate one, two, three or four of the section indicators 108 and mechanical dies 106 in a game depending on the selections 112 picked by the player. If the player picks a selection that reveals the "pick again" message, the gaming device enables the player to pick another of the selections 112 from the selection display 110. Additionally, the gaming device activates the corresponding section indicator 108 and mechanical die 106 associated with the picked selection 112. The player then picks another of the selections 112 to activate another of the section indicators and modifier generators 106 in the game. The player picks selections 112 until the player picks a selection including the message "look up" which is a terminator in the game.

In the example shown in FIG. 3A, if the player picks selection 112*d* with their first pick in the game, the gaming device activates the section indicator 108*d* and mechanical die 106*d* and then prohibits the player from picking any further selections in the game. If the player picks selection 112*d* with their fourth or final pick in the game, the gaming device activates all of the section indicators and mechanical dice. Therefore, the player's goal is to pick all of the selections 112 before getting the terminator (i.e., a selection including the message "look up").

In an alternative embodiment, the processor provides a designated number of picks of the selections 112 to a player. The player uses the picks to pick the selections 112 until the player picks a selection associated with a terminator or until there are no picks remaining in the game. It should be appreciated that the designated number of picks may be randomly determined, predetermined, based on a wager made by a player or determined according to any suitable determination method.

In another alternative embodiment, the message (e.g., "look up") or other suitable indicator, which identifies when the player has picked a selection including a terminator, does not appear on the selection itself when the player picks that selection. Instead, the message appears in a different location which is viewable by the player. In one aspect of this embodiment, the message is displayed at a different location on the display device which is separate from the selections or the selection display. In another aspect, the message is displayed separately or independently from the display or display device including the selections such as on a different display device. It should be appreciated that the message may be displayed on the same display device or on a different display device from the selections. It should also be appreciated that the message or indicator may be displayed at any suitable location on the same display device as the selections or at any suitable location on a different display device from the display device including the selections.

Once the player picks the selection including the terminator or terminator symbol, the gaming device activates the rotatable display 100 and each of the symbol modifying indicators 106. Once the rotatable display 100 stops rotating and each of the symbol modifying indicators 106 generates a modifier such as a multiplier, the gaming device determines the award to provide to the player in the game. In one embodiment, the award equals the sum of the products of each of the multipliers generated by the activated mechanical dies 106 and the values 104 of the sections 102 that correspond to the activated mechanical dies 106. Thus, the gaming device only generates the award based on the section indicators 108 and the mechanical die that have been activated (i.e., picked by the player) in the game. For example, as illustrated in FIG. 4A, the section indicators and symbol modifying indicators 106*c* and 108*c* and 106*d* and 108*d* have been activated in the game. Therefore, the gaming device provides an award of five hundred to the player based on the value of fifty multiplied by the multiplier of 2× plus the value one hundred multiplied by the multiplier of 4×.

Referring to FIGS. 4B to 4E, an example of the embodiment of FIG. 4A is illustrated where the selection display 110 includes four selections 112*a*, 112*b*, 112*c* and 112*d*. Each of the selections 112*a*, 112*b*, 112*c* and 112*d* activates each of the section indicators 108 and corresponding mechanical dies 106 which are associated to those selections. For example, mechanical die 106*a* and section indicator 108*a* are associated with selection 112*a*. Mechanical die 106*b* and section indicator 108*b* are associated with selection 112*b*. Mechanical dies 106*c* and section indicator 108*c* are associated with selection 112*c*. Mechanical dies 106*d* and section indicator 108*d* are associated with selection 112*d*. Additionally, the gaming device displays or includes the rotatable display 100 which includes a plurality of selections 102. Each of the selections 102 includes at least one award value 104 such as the award values of fifty, forty, thirty, five, one hundred, seventy and twenty-five. In this example, the symbol modifying indicators or mechanical dies 106 generate a symbol which represents a multiplier value. For example, mechanical die 106*c* shows a symbol representing the number two which indicates a multiplier of 2×. The total award display 114 indicates a total award of zero at the beginning of the game.

Figure 4B:
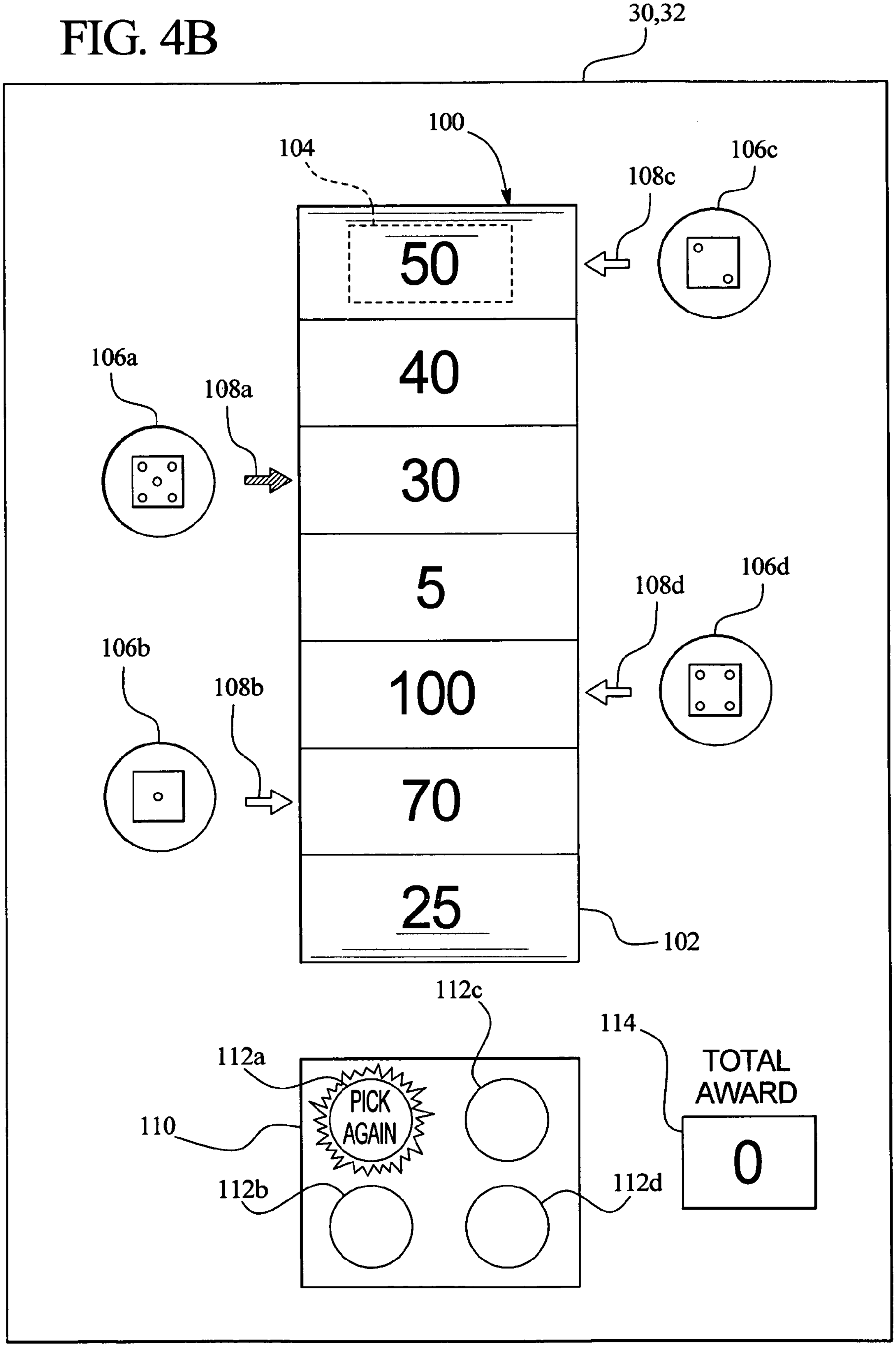

Referring specifically to FIG. 4B, the player picks selection 112*a* from the selection display 110 with their first pick in the game. Selection 112*a* reveals the message "pick again" and also activates mechanical die 106*a* and the corresponding section indicator 108*a*. Because the player picked a selection including the "pick again" message, the gaming device enables the player to pick another selection from the selection display.

Figure 4C:
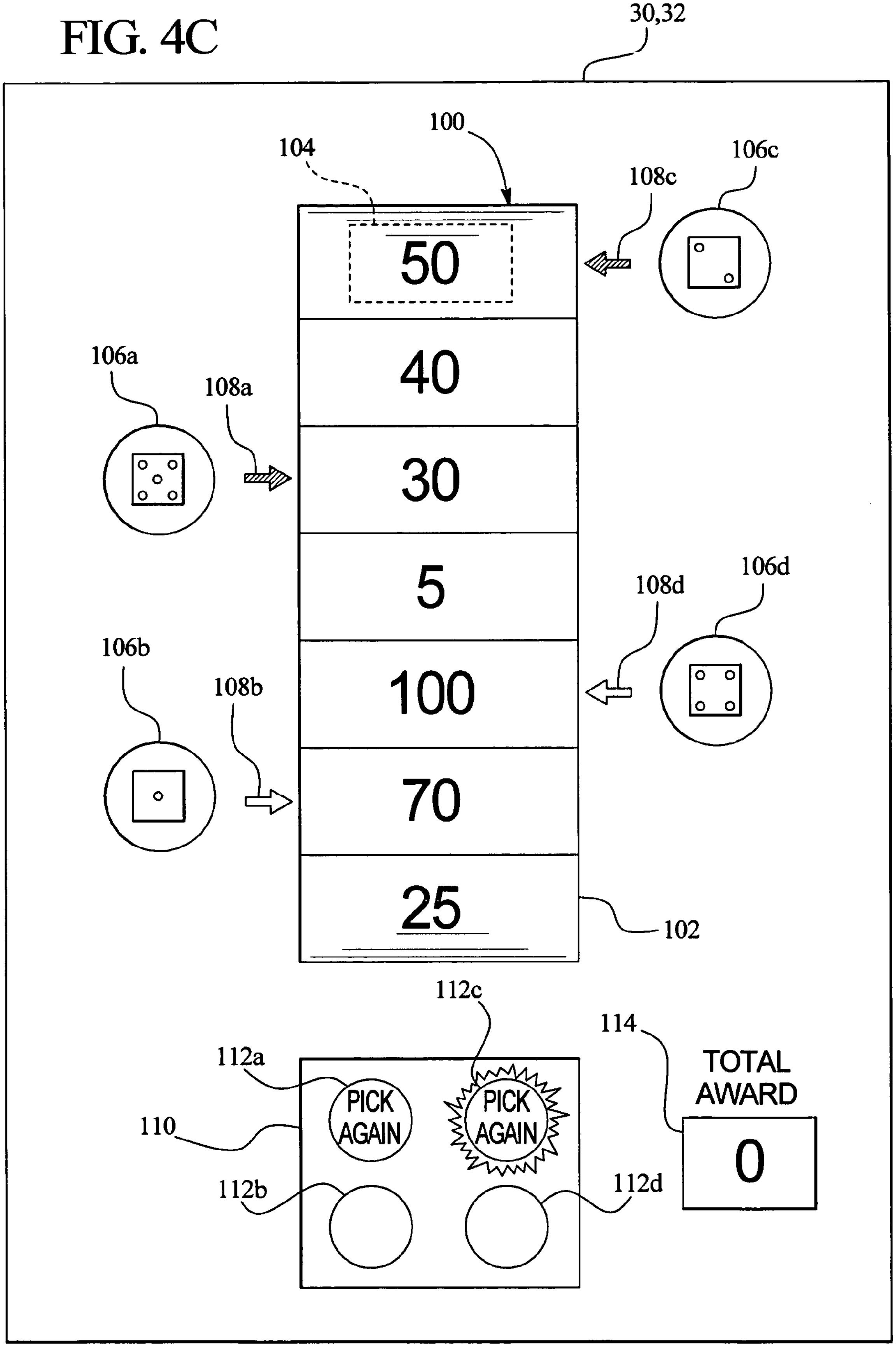

In FIG. 4C, the player picks a second selection 112*c* from the selection display 110. The selection 112*c* reveals the message "pick again" which also activates mechanical die 106*c* and section indicator 108*c* in the game. The gaming device enables the player to pick another selection from the selection display 110.

Figure 4D:
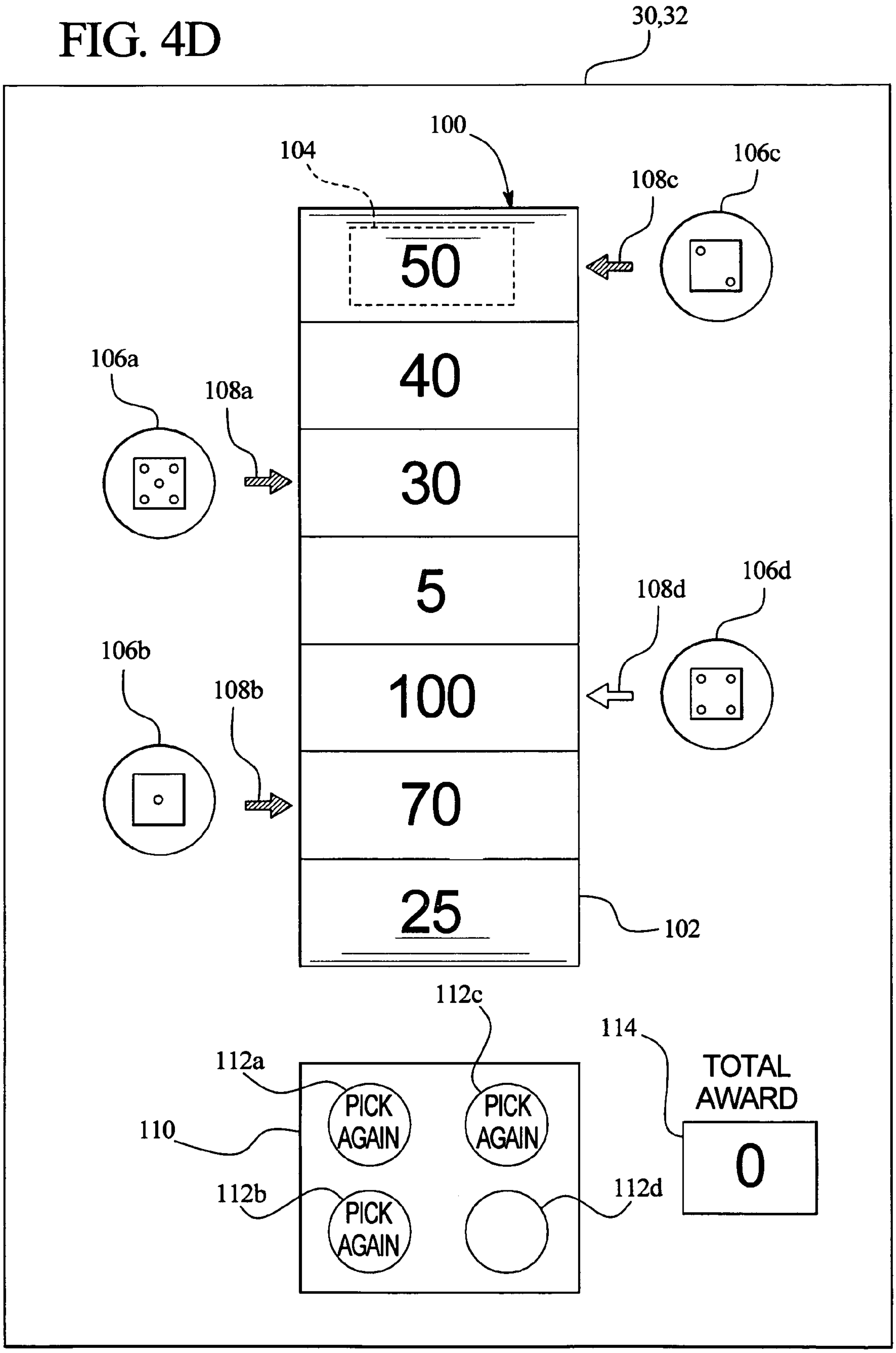

In FIG. 4D, the player picks a third selection, selection 112*b*, in the game, which reveals the message "pick again." The gaming device activates mechanical die 106*b* and section indicator 108*b* which are associated with this selection. Because the player has not picked a selection including a terminator, the gaming device enables the player to pick their final selection in the game.

Figure 4E:
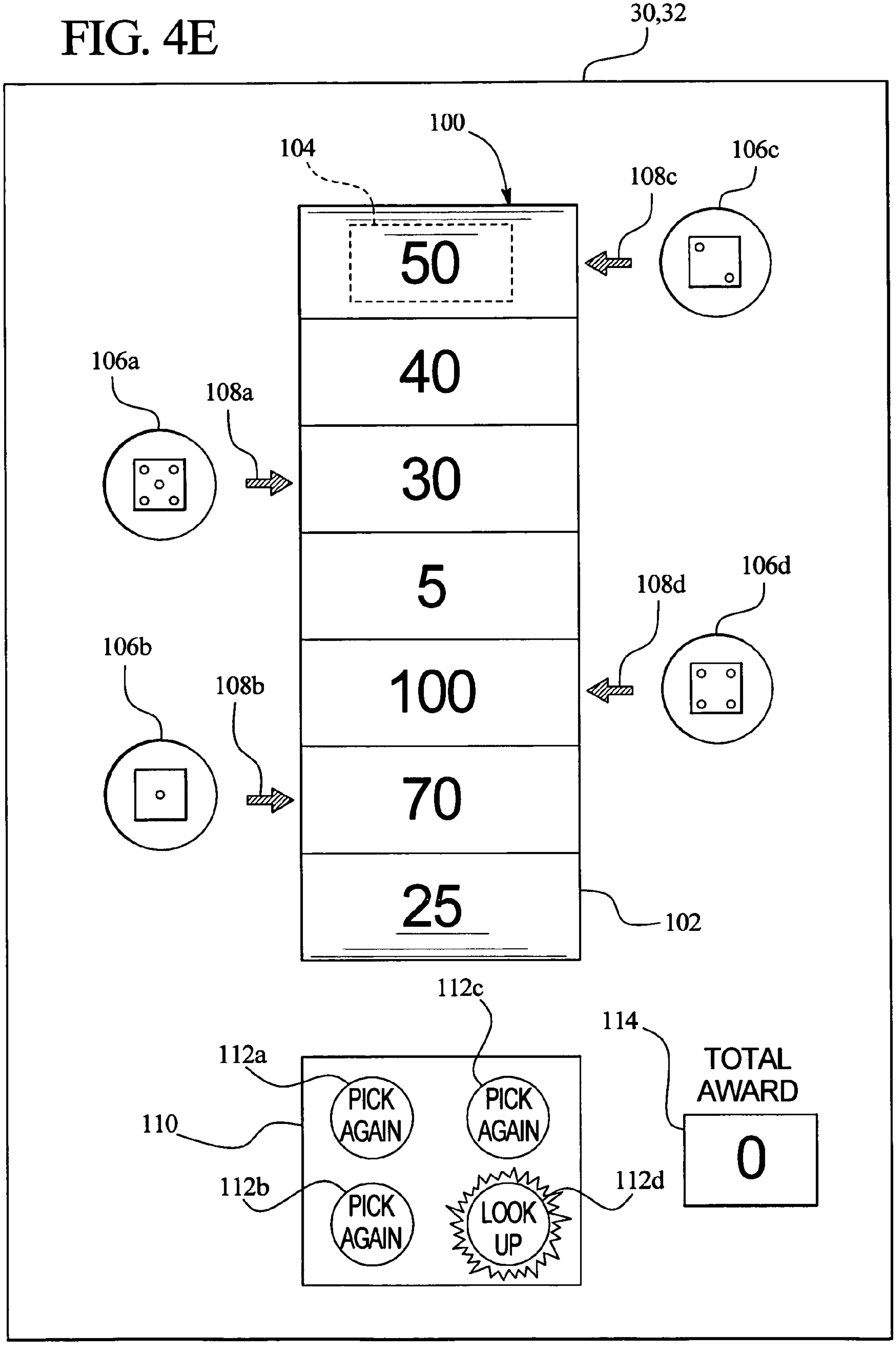

In FIG. 4E, the player picks the final selection, selection 112*d*, in the game. It should be appreciated that although the player picked the selection 112*d*, in another embodiment, the gaming device automatically activates the modifier generator and section indicator associated with the selection. In this example, the gaming device activates mechanical die 106*d* and section indicator 108*d* associated with selection 112*d*. Because selection 112*d* reveals the message "look up" (i.e., the terminator or terminator symbol) as shown in FIG. 4E, the gaming device does not enable the player to pick any more selections in the game. Regardless, there are no selections remaining in the game and therefore the gaming device automatically causes the activated mechanical dice to generate multipliers and causes the rotatable display to rotate and display award values in the game.

Figure 4F:
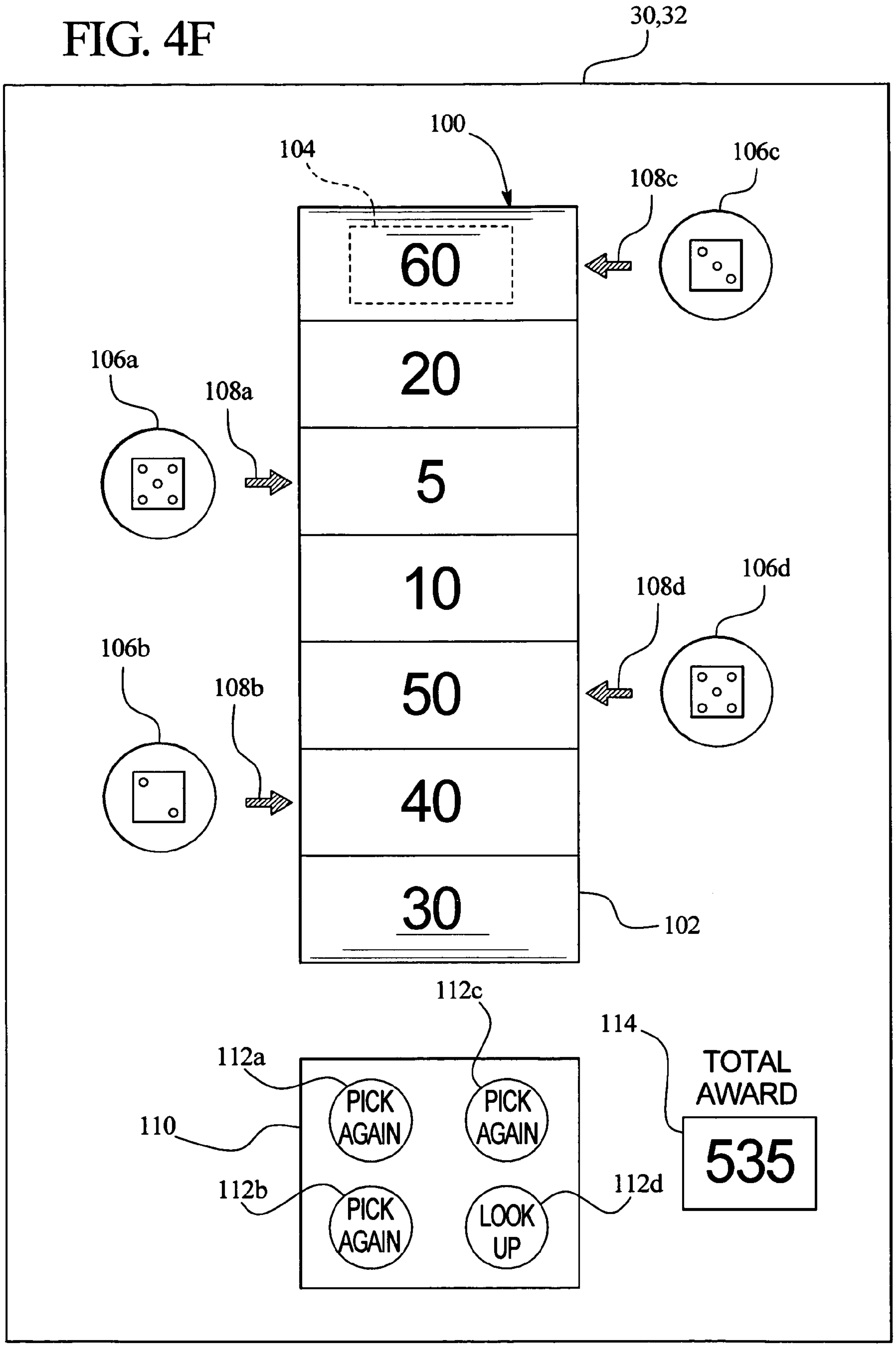

In FIG. 4F, the rotatable display 100 stops spinning and indicates or displays award values of sixty, twenty, five, ten, fifty, forty and thirty. The symbol modifying indicators or mechanical dies 106*a*, 106*b*, 106*c* and 106*d* indicate multipliers of 5×, 2×, 3× and 5×, respectively. The activated mechanical die 106*a* is associated with a section including an award value of five to provide an award of twenty-five. The activated mechanical die 106*b* is associated with a section including an award value of forty which provides an award of eighty. The activated mechanical die 106*c* is associated with a section including an award of sixty and therefore provides an award value of one hundred-eighty. The activated mechanical die 106*d* is associated with a section including an award value of fifty which provides an award of two-hundred fifty. The gaming device sums or adds all of the awards together to provide a total award to the player of five hundred thirty-five as indicated by the total award display 114. It should be appreciated that the gaming device may add, multiply, divide, subtract or otherwise combine or modify the section awards associated with each of the symbol modifying indicators in a game. The gaming device provides the total award of five hundred thirty-five to the player and the game ends.

Figure 5:
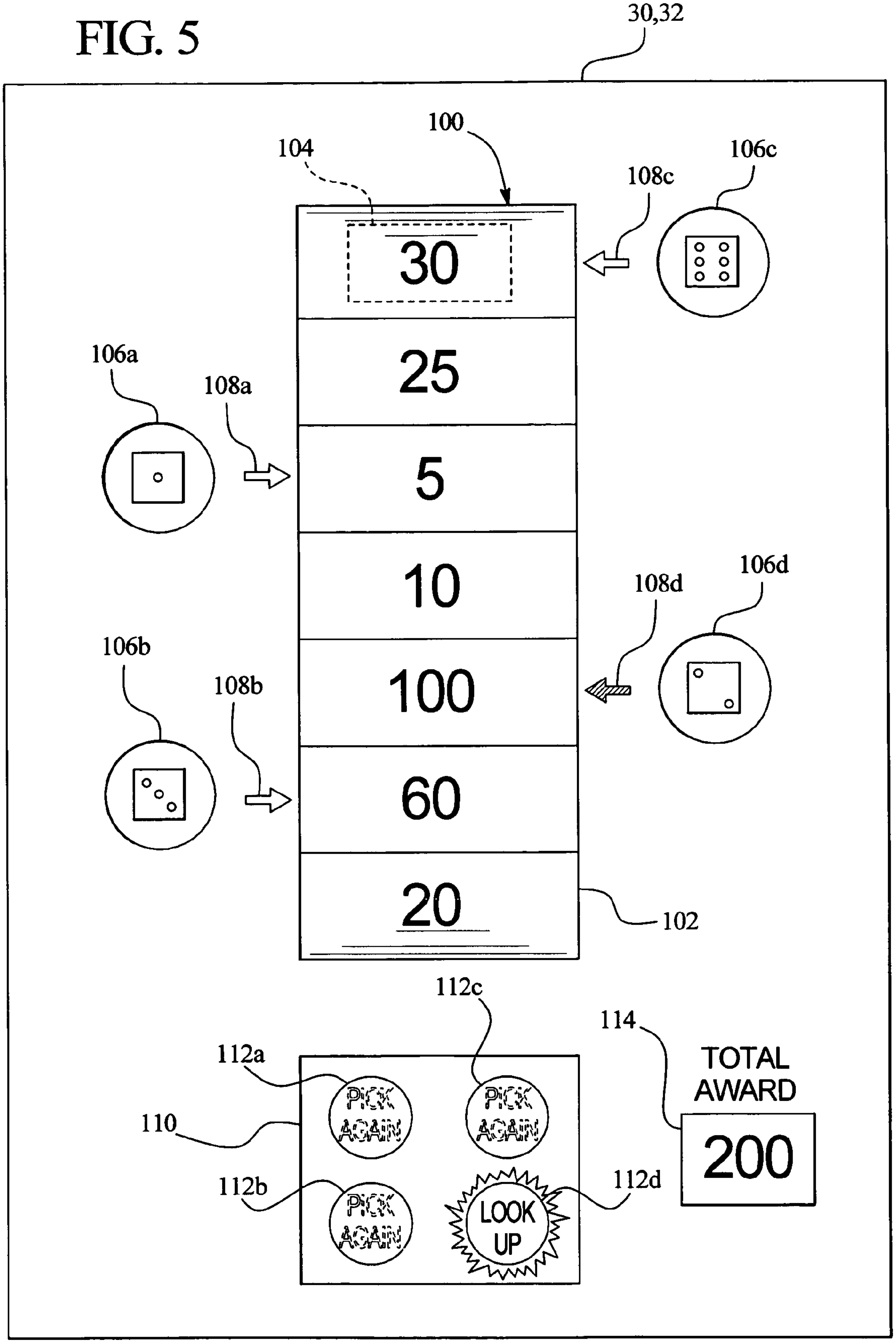
FIG. 5 is an enlarged elevation view of another example of the alternative embodiment of FIGS. 4A to 4F.

Referring now to FIG. 5, another example of the embodiment of FIGS. 4A to 4F is illustrated where the player picks the terminator or terminator symbol with the first pick in the game. In this example, the player picks selection 112*d* which reveals the message "look up." Because the player picked the terminator, the gaming device does not enable the player to pick any more selections from the selection display 110. The gaming device activates the mechanical die 106*d* and the section indicator 108*d* associated with the selection 112*d* in the game. The gaming device then rotates the rotatable display 100 and activates each of the mechanical dies in the game. The rotatable display 100 stops rotating and indicates awards of thirty, twenty-five, five, ten, one hundred, sixty and twenty. The modifier generated is the number two or a multiplier of 2×. The modifier of 2× is multiplied by the value one hundred associated with the section directly adjacent to the activated symbol modifying indicator 106*d*. This provides an award of two hundred which becomes the player's total award as indicated by the total award display 114. The game ends and the gaming device provides the player with the total award of two hundred.

In one alternative embodiment, the number of symbol modifying indicators such as the number of mechanical dice, is greater than the number of selections associated with the symbol modifying indicators. For example, the gaming device provides or displays six symbol modifying indicators which indicate locations on the rotatable display and four selections associated with the six symbol modifying indicators in a game. The gaming device then enables a player to pick selections to activate four of the six symbol modifying indicators. In another alternative embodiment, each selection is associated with one or a plurality of symbol modifying indicators. In this embodiment, the gaming device enables the player to pick the selections and activate a portion of or all of the symbol modifying indicators in the game depending on the number of symbol modifying indicators that are associated with the selections. It should be appreciated that any suitable number of symbol modifying indicators may be associated with the selections in a game or games.

In another alternative embodiment, the gaming device provides a number of selections which is greater than the number of symbol modifying indicators in a game. In this embodiment, one or more of the selections are associated with one or more of the symbol modifying indicators. The gaming device enables the player to pick selections until all of the symbol modifying indicators are activated or until the player picks a selection associated with a terminator or terminator symbol. It should be appreciated that the selections may be associated with one or a plurality of terminators or terminator symbols, one or plurality of symbol modifying indicators, one or a plurality of outcomes such as awards or any suitable number of terminators, symbol modifying indicators, awards or other outcomes.

Figure 6:
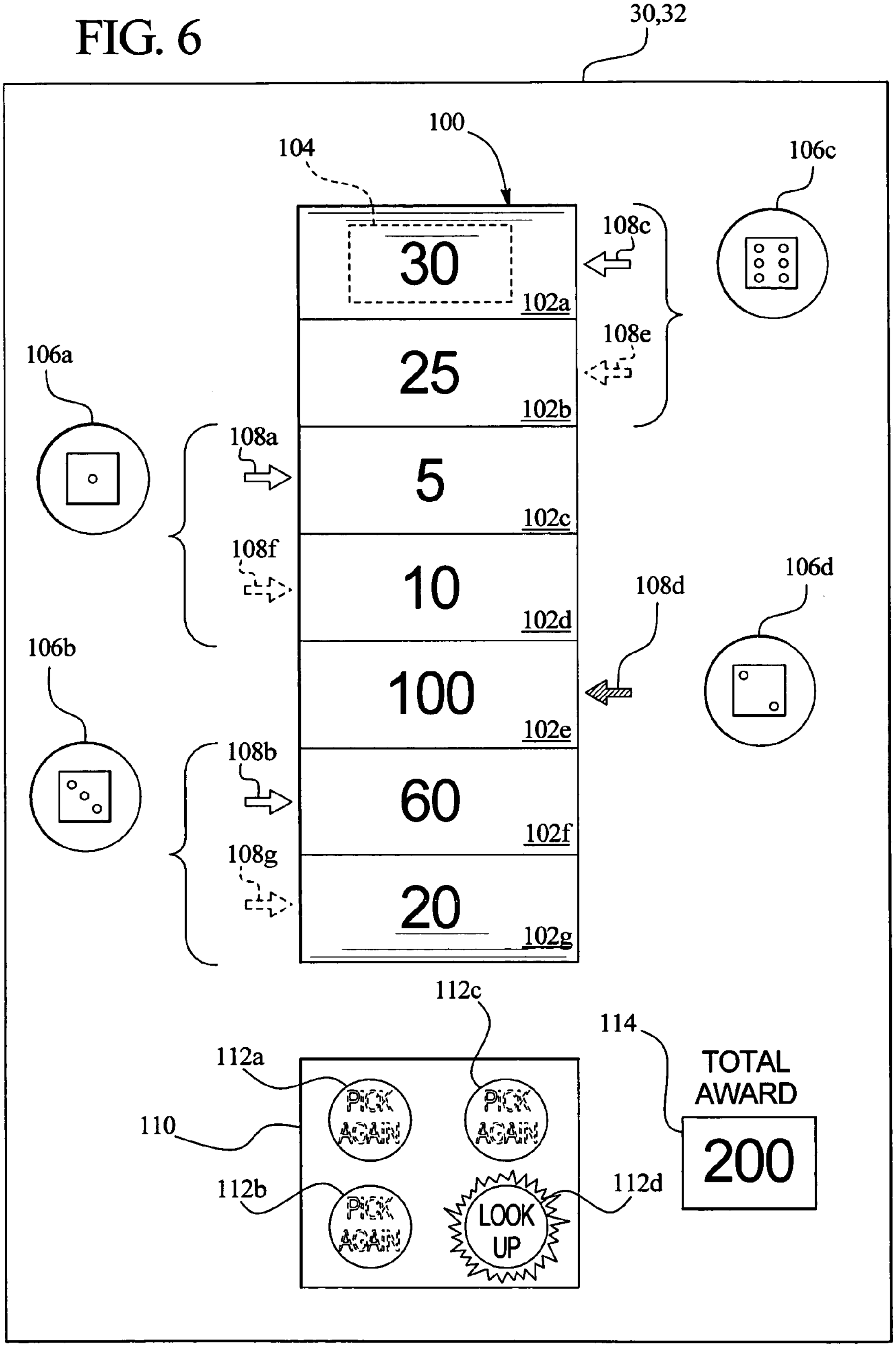
FIG. 6 is an enlarged elevation view of another alternative embodiment of the present invention where the symbol modifying indicators are randomly associated with the sections of the rotatable display.

Referring now to FIG. 6, in another alternative embodiment of the present invention, each of the symbol modifying indicators 106 including associated section indicators 108 are initially associated with a plurality of sections 102 of the rotatable display 100. The gaming device then randomly determines and activates one or more of the section indicators to indicate one or more of the sections 102 associated with the symbol modifying indicator. For example, symbol modifying indicator 106*c* includes section indicators 108*c* and 108*e*. In this embodiment, the gaming device randomly determines and activates section indicator 108*c* or 108*e*. The gaming device activates section indicator 108*c* (shown in solid lines) and does not activate section indicator 108*e* (shown in phantom). Thus, symbol modifying indicator 106*c* is associated with section 102*a* of the rotatable display 100 in this game. It should be appreciated that the gaming device may determine and activate one or more of the section indicators associated with the symbol modifying indicators in each activation of the rotatable display or in a plurality of activations of the rotatably display.

In one embodiment, the selection display 110 includes selections which are each associated with one of the section indicators 108*a*, 108*b*, 108*c*, 108*d*, 108*e*, 108*f* and 108*g*. Therefore, one or more of the section indicators 108 are independently activated when the player picks the selections from the selection display in a play of the game. In another embodiment, a plurality of the section indicators 108 are activated for each selection picked by the player. It should be appreciated that one, a plurality or all of the section indicators may be activated when a player picks one or more of the selections 112 from the selection display 110. In a further embodiment, each selection indicates a group of section indicators such as section indicators 108*a* and 108*f*. The gaming device then randomly picks one or more of the section indicators in the group to activate in a play of the game. It should be appreciated that the selections may indicate one or more groups of section indicators. It should also be appreciated that the one, a plurality or all of the section indicators in a group may be activated upon one or more selections picked by the player.

Figure 7:
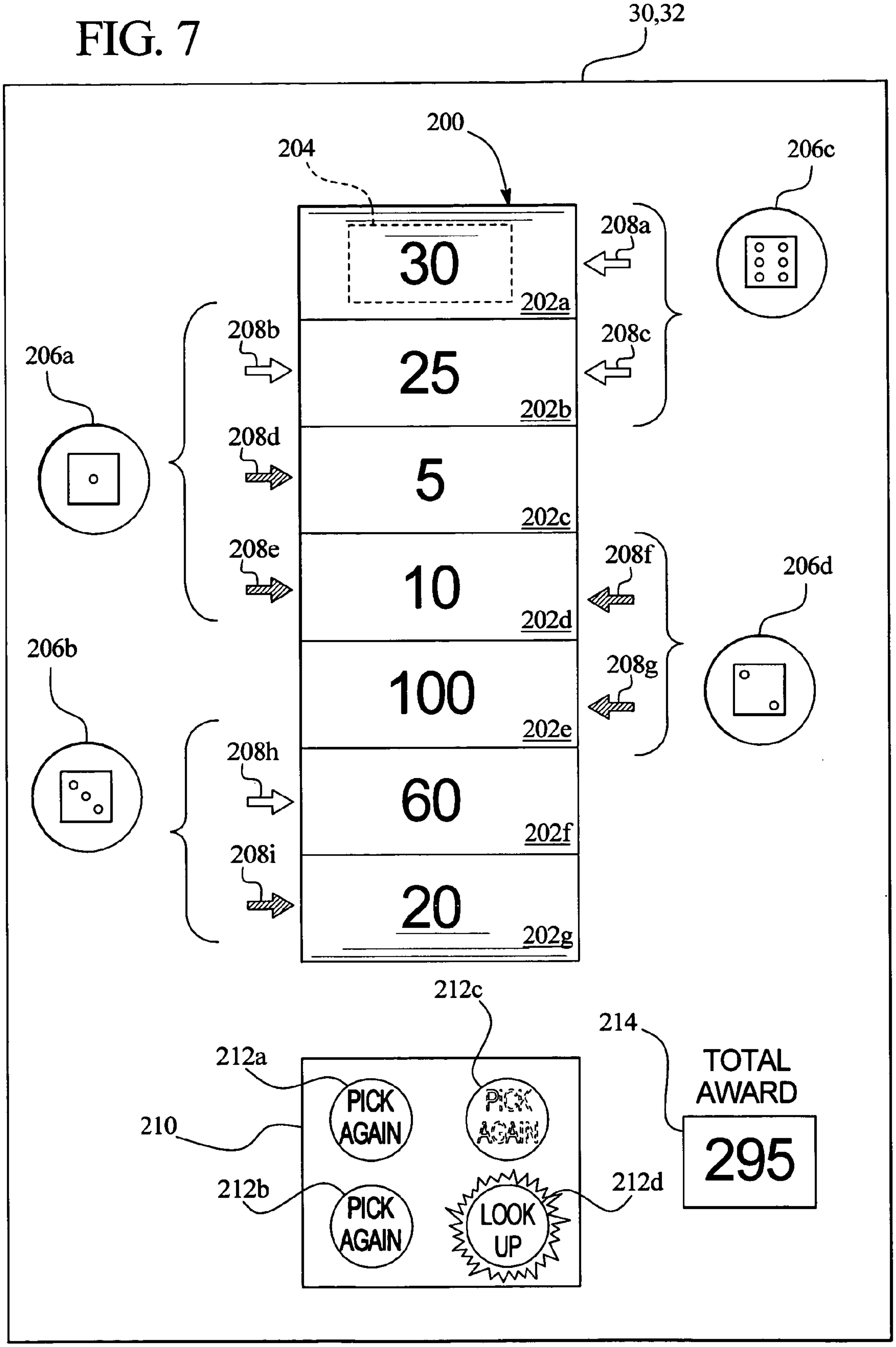
FIG. 7 is an enlarged elevation view of another alternative embodiment of the present invention where at least two of the symbol modifying indicators are associated with the same section of the rotatable display.

Referring now to FIG. 7, another embodiment of the present invention is illustrated where the symbol modifying indicators 206*a*, 206*b*, 206*c* and 206*d* include section indicators 208*a* to 208*i* which indicate a plurality of the sections 208*a* to 208*g* for each of the symbol modifying indicators. Specifically, the rotatable display 200 includes a plurality of sections 202*a*, 202*b*, 202*c*, 202*d*, 202*e*, 202*f* and 202*g* each having at least one symbol or outcome such as an award 204. Symbol modifying indicator 206*a* includes three section indicators 208*b*, 208*d* and 208*e* which are each associated with one of the sections of the rotatable display 200 such as sections 202*b*, 202*c* and 202*d*. It should be appreciated that each of the section indicators 208 may be associated with one or a plurality of the sections of the rotatable display. Symbol modifying indicator 206*b* includes two section indicators 208*h* and 208*i* which are associated with or indicate section 202*f* and 202*g*, respectively. Symbol modifying indicator 206*c* includes section indicators 208*a* and 208*c* which indicate sections 202*a* and 202*b*, respectively. Symbol modifying indicator 206*d* includes section indicators 208*f* and 208*g* which indicate sections 202*d* and 202*e*, respectively. As illustrated in FIG. 7, each of the section indicators 208 indicate at least one of the sections 202 of the rotatable display 200 and two or more of the section indicators 208 indicate the same section 202 of the rotatable display. For example, section indicator 208*b* and 208*c* indicate the same section 202*b* of the rotatable display. Similarly, section indicators 208*e* and 208*f* indicate the same section 202*d* of the rotatable display. If both of the section indicators are activated in a play of the game, the gaming device provides two awards to the player based on the same section of the rotatable display. This embodiment therefore enables a player to obtain multiple awards associated with one of the sections of the rotatable display and to obtain a relatively large award for any one of the sections of the rotatable display. This increases the excitement and enjoyment of the game for players because players can obtain a plurality of awards and possibly a relatively large award in a play of the game.

In one example illustrated in FIG. 7, the gaming device enables the player to pick the selections 212*a*, 212*b*, 212*c* and 212*d* in the selection display 210. In this example, a player picks selections 212*a*, 212*b* and 212*d* in this play of the game. After picking the selections 212*a*, 212*b* and 212*d*, the player activates sections indicators 208*d*, 208*e*, 208*f*, 208*g* and 208*i* associated with symbol modifying indicators 206*a*, 206*b* and 206*d*. In one embodiment, the gaming device enables the player to active at least one of the section indicators 208 associated with each symbol modifying indicator in a play of the game. It should be appreciated that one, a plurality or all of the section indicators 208 may be activated for each pick of the symbol modifying indicators in a play of the game. Section indicators 208*d* and 208*e* were activated when the player picked and activated the symbol modifying indicator 206*a*.

Section indicator 208*i* was activated when the player picked and activated symbol modifying indicator 206*b*. Section indicators 208*f* and 208*g* were activated when the player picked and activated symbol modifying indicator 206*d*. The rotatable display 200 rotated or moved to indicate symbols such as the awards 204 associated with each of the sections 202. Also, each of the activated symbol modifying indicators 206*a*, 206*b* and 206*d* generated modifiers such as multipliers of 1×, 3× and 2×, respectively. The gaming device therefore provides awards of five (associated with section indicator 208*d*), ten (associated with section indicator 208*e*), twenty (associated with section indicator 208*f*), two hundred (associated with section indicator 208*g*) and sixty (associated with section indicator 208*i*). The gaming device sums the awards and provides the total award of two hundred ninety-five to the player as indicated by the total award display 214. In particular, the player received multiple awards associated with section 202*b* because section indicators 208*e* and 208*f* both indicated this section of the rotatable display.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a display device;

an input device;

a processor; and a memory device which stores a plurality of instructions, which when executed by the processor, causes the processor to operate with the display device and the input device to:

(i) display a game including a plurality of symbols and a plurality of modifiers, (ii) display a symbol display including a plurality of sections, each of said sections including one of the symbols, (iii) display a plurality of selectable symbol modifying indicators, each of said symbol modifying indicators operable to: (a) indicate at least one of said sections of said symbol display, and (b) display one of the modifiers, (iv) display a plurality of selections, each of said selections associated with one of said symbol modifying indicators, (v) cause a pick of at least one of the selections, (vi) for each picked selection, activate said symbol modifying indicator associated with said picked selection, (vii) activate the symbol display to cause the symbol display to display a plurality of the symbols associated with said sections, (viii) for each activated symbol modifying indicator, cause said activated symbol modifying indicator to display one of the modifiers, and (ix) provide an award to the player, wherein the award is based on each modifier generated by each activated symbol modifying indicator and the symbol of the respective section indicated by said activated symbol modifying indicator.

2. The gaming device of claim 1, wherein the symbol display is selected from a mechanical reel or a mechanical wheel.

3. The gaming device of claim 1, wherein at least one of the symbols represents a value.

4. The gaming device of claim 1, wherein at least one of the symbol modifying indicators includes a mechanical die.

5. The gaming device of claim 1, which includes a second display device operable to display the selections, wherein when executed by the processor, the plurality of instructions causes the processor to operate with the second display device to display the selections.

6. The gaming device of claim 1, wherein the symbols represent values and the modifiers include multipliers.

7. The gaming device of claim 6, wherein the award includes the value indicated by each activated symbol modifying indicator multiplied by the multiplier generated by said activated symbol modifying indicator.

8. The gaming device of claim 1, wherein at least one of the selections is associated with a plurality of the symbol modifying indicators.

9. The gaming device of claim 1, wherein a plurality of the selections are associated with at least one of the symbol modifying indicators.

10. The gaming device of claim 1, wherein a number of the selections is greater than a number of the symbol modifying indicators.

11. The gaming device of claim 1, wherein a number of the symbol modifying indicators is greater than a number of the selections.

12. The gaming device of claim 1, which includes a designated number of picks of the selections, wherein when executed by the processor, the plurality of instructions causes the processor to enable the player to pick the selections.

13. The gaming device of claim 12, which includes a terminator associated with one of the selections, and wherein when executed by the processor, the plurality of instructions causes the processor to enable the player to determine the number of activated symbol modifying indicators by picking the selections until the player picks the selection associated with the terminator.

14. The gaming device of claim 12, wherein each of the selections includes an indicator that indicates which of the symbol modifying indicators are associated with the selections, and wherein when executed by the processor, the plurality of instructions causes the processor to, for each of the designated number of picks, enable the player to pick one of the selections.

15. The gaming device of claim 1, wherein at least two of said symbol modifying indicators indicate the same section.

16. A gaming device operated under the control of a processor, said gaming device comprising:

a display device;

an input device;

a processor; and a memory device which stores a plurality of instructions, which when executed by the processor, causes the processor to operate with the display device and the input device to:

(i) display a game including a plurality of symbols and a plurality of modifiers, (ii) display a symbol display including a plurality of sections, each of said sections including one of the symbols;

(iii) display a plurality of activatable symbol modifying indicators, each of said symbol modifying indicators operable to:

(a) indicate at least one of said sections of said symbol display, and (b) display one of said modifiers;

(iv) activate at least one of said symbol modifying indicators, (v) for each activated symbol modifying indicator, cause said activated symbol modifying indicator to display one of the modifiers, (vi) cause the symbol display to display a plurality of the symbols associated with said sections, and (vii) provide an award to the player, wherein the award is based on each modifier generated by each activated symbol modifying indicator and the symbol of the respective section indicated by said activated symbol modifying indicator.

17. The gaming device of claim 16, wherein the symbol display is selected from at least one of a mechanical reel and a mechanical wheel.

18. The gaming device of claim 16, wherein at least one of the symbols represents a value.

19. The gaming device of claim 16, wherein at least one of the symbol modifying indicators includes a mechanical die.

20. The gaming device of claim 16, wherein the symbols represent values and the modifiers include multipliers.

21. The gaming device of claim 20, wherein the award includes each value indicated by each activated symbol modifying indicator multiplied by the multiplier generated by said respective activated symbol modifying indicator.

22. The gaming device of claim 16, wherein at least two of said symbol modifying indicators indicate the same section.

23. A gaming device comprising:

a display device;

an input device;

a processor; and a memory device which stores a plurality of instructions, which when executed by the processor, causes the processor to operate with the display device and the input device to:

(i) display a game including a plurality of different symbols;

(ii) display a plurality of the symbols;

(iii) display a plurality of selectable symbol modifying indicators, a plurality of the symbol modifying indicators operable to: (a) indicate one of the symbols, and (b) display one of a plurality of different modifiers, and at least one of the symbol modifying indicators operable to: (a) indicate a plurality of the symbols, and (b) display one of a plurality of the different modifiers;

(iv) after an occurrence of a triggering event associated with the game, cause a selection of at least one of the symbol modifying indicators, (v) cause each selected symbol modifying indicator to indicate: (a) at least one of the symbols, and (b) one of the modifiers; and (vi) cause an award to be provided to a player based on each indicated symbol and the modifier indicated by the selected symbol modifying indicator which indicates each of said symbols.

24. The gaming device of claim 23, which includes at least one selector associated with the symbol modifying indicators, said selector enabling the player to pick one, a plurality or all of the symbols indicated by the symbol modifying indicators.

25. A method of operating a gaming device including a plurality of instructions, said method comprising:

(a) causing a display device to display a plurality of sections, each of said sections including one of a plurality of symbols;

(b) causing the display device to display a plurality of symbol modifying indicators, each of said symbol modifying indicators operable to indicate at least one of said sections and to display one of a plurality of modifiers;

(c) causing the display device to display a plurality of selections, at least one of said selections associated with at least one of the symbol modifying indicators;

(d) causing the display device to display a plurality of the symbols associated with said sections;

(e) causing a processor to execute the plurality of instructions to cause a pick of at least one of the plurality of selections;

(f) causing the processor to execute the plurality of instructions to activate each symbol modifying indicator associated with one of the picked selections;

(g) causing the processor to execute the plurality of instructions to cause each activated symbol modifying indicator to generate one of the modifiers; and (h) causing the processor to execute the plurality of instructions to provide an award to the player, wherein the award is based on the modifier generated by each activated symbol modifying indicator and the symbol of the section indicated by said respective symbol modifying indicator.

26. The method of claim 25, wherein the symbols represent values and the modifiers include multipliers, and which includes causing the processor to execute the plurality of instructions to provide the product of the value indicated by the activated symbol modifying indicator multiplied by the multiplier generated by said activated symbol modifying indicator as the award.

27. The method of claim 25, which includes causing the processor to execute the plurality of instructions to enable the player to pick at least one of the selections.

28. The method of claim 27, which includes causing the processor to execute the plurality of instructions to associate a terminator with at least one of the selections, wherein the terminator terminates the picking of the selections by the player when the player picks the selection including the terminator.

29. The method of claim 27, which includes causing the display device to indicate to the player which of the symbol modifying indicators are associated with each of the selections and causing the processor to execute the plurality of instructions to enable the player to pick the selections for a designated number of picks of the selections.

30. The method of claim 25, wherein the steps (a) to (h) are provided to the player through a data network.

31. The method of claim 30, wherein the data network is an internet.

* * * * *